United States Patent
Soon-Shiong

(10) Patent No.: US 11,004,102 B2
(45) Date of Patent: May 11, 2021

(54) METHODS AND SYSTEMS FOR RECONCILING A TRANSACTION WITHIN A COMPUTER-BASED GAME

(71) Applicant: Nant Holdings IP, LLC, Culver City, CA (US)

(72) Inventor: Patrick Soon-Shiong, Los Angeles, CA (US)

(73) Assignee: Nant Holdings IP, LLC, Culver City, CA (US)

( * ) Notice: Subject to any disclaimer, the term of this patent is extended or adjusted under 35 U.S.C. 154(b) by 0 days.

(21) Appl. No.: 16/841,586

(22) Filed: Apr. 6, 2020

(65) Prior Publication Data

US 2020/0234323 A1 Jul. 23, 2020

Related U.S. Application Data

(60) Continuation of application No. 16/422,901, filed on May 24, 2019, now Pat. No. 10,614,477, which is a
(Continued)

(51) Int. Cl.
*G06Q 30/02* (2012.01)
*G06Q 30/06* (2012.01)
(Continued)

(52) U.S. Cl.
CPC ....... *G06Q 30/0222* (2013.01); *G06Q 20/227* (2013.01); *G06Q 20/387* (2013.01);
(Continued)

(58) Field of Classification Search
CPC ............. G06Q 30/0222; G06Q 20/227; G06Q 20/387; G06Q 20/4016; G06Q 20/405; G06Q 30/02; G06Q 30/06
See application file for complete search history.

(56) References Cited

U.S. PATENT DOCUMENTS 6,336,098 B1 * 1/2002 Fortenberry ........... G06Q 30/02
705/14.23
7,650,616 B2 1/2010 Lee
(Continued)

FOREIGN PATENT DOCUMENTS

EP 1 965 344 A1 9/2008
JP 2002-056163 A 2/2002
(Continued)

OTHER PUBLICATIONS

A. Kraft, S. Pitsch and M. Vetter, "Agent-driven online business in virtual communities," Proceedings of the 33rd Annual Hawaii International Conference on System Sciences, Maui, HI, USA, 2000, pp. 10 pp. vol. 2-, doi: 10.1109/HICSS.2000.926995. (Year: 2000).*

(Continued)

*Primary Examiner* — Ashford S Hayles
(74) *Attorney, Agent, or Firm* — Mauriel Kapouytian Woods LLP; Elaine K. Lee; Andrew A. Noble

(57) ABSTRACT

Methods and systems of reconciling a transaction in a computer-based game are disclosed. At least one object attribute is determined, based on physical data associated with a first player whose physical data has been derived from at least one sensor. A first transaction amount of game points between a provider and a first user account of the first player and a second transaction amount of game points between a provider and a second user account of a second player are determined. The transaction amounts are determined based on a reconciliation matrix and the at least one object attribute. Game point transactions for the first transaction amount and the second transaction amount are reconciled among the provider, the first user account, and the second user account when at least one criterion based on the
(Continued)

physical data of the first player is met within the computer game.

20 Claims, 9 Drawing Sheets

Related U.S. Application Data division of application No. 16/173,882, filed on Oct. 29, 2018, now Pat. No. 10,304,073, which is a continuation of application No. 15/947,152, filed on Apr. 6, 2018, now Pat. No. 10,115,122, which is a continuation of application No. 15/719,422, filed on Sep. 28, 2017, now Pat. No. 10,147,113, which is a continuation of application No. 14/359,913, filed as application No. PCT/US2013/034164 on Mar. 27, 2013, now Pat. No. 9,805,385, which is a continuation-in-part of application No. PCT/US2012/066300, filed on Nov. 21, 2012.

(60) Provisional application No. 61/562,385, filed on Nov. 21, 2011.

(51) Int. Cl.
  *G06Q 20/22* (2012.01)
  *G06Q 20/38* (2012.01)
  *G06Q 20/40* (2012.01)

(52) U.S. Cl.
  CPC ....... *G06Q 20/405* (2013.01); *G06Q 20/4016* (2013.01); *G06Q 30/02* (2013.01); *G06Q 30/06* (2013.01)

(56) References Cited

U.S. PATENT DOCUMENTS

| | | | |
|---|---|---|---|
| 7,729,925 B2* | 6/2010 | Maritzen | G06Q 30/0601 705/1.1 |
| 7,930,340 B2* | 4/2011 | Arunachalam | G06Q 30/06 709/203 |
| 8,118,297 B2 | 2/2012 | Izumichi | |
| 8,130,242 B2 | 3/2012 | Cohen | |
| 8,210,934 B2* | 7/2012 | Ocko | A63F 13/792 463/25 |
| 8,218,873 B2 | 7/2012 | Boncyk et al. | |
| 8,224,077 B2 | 7/2012 | Boncyk et al. | |
| 8,224,078 B2 | 7/2012 | Boncyk et al. | |
| 8,234,218 B2* | 7/2012 | Robinson | G06F 3/04815 705/54 |
| 8,311,940 B2* | 11/2012 | Shuster | G06Q 20/40 705/39 |
| 8,315,944 B2* | 11/2012 | Driemeyer | G06Q 30/06 705/39 |
| 8,316,450 B2* | 11/2012 | Robinson | G06Q 30/02 726/26 |
| 8,606,645 B1* | 12/2013 | Applefeld | G06Q 30/02 705/26.1 |
| 8,615,426 B2* | 12/2013 | Carlson | G06Q 30/02 705/14.1 |
| 8,633,946 B2 | 1/2014 | Cohen | |
| 8,644,842 B2* | 2/2014 | Arrasvuori | G06T 19/006 455/456.1 |
| 8,818,848 B2* | 8/2014 | Carpenter | G06Q 30/0249 705/14.25 |
| 9,141,961 B2* | 9/2015 | Rajan | G06Q 30/0224 |
| 9,324,091 B2* | 4/2016 | Randell | G06Q 30/0235 |
| 9,395,875 B2* | 7/2016 | Geraci | G06F 16/248 |
| 9,805,385 B2 | 10/2017 | Soon-Shiong | |
| 10,115,122 B2 | 10/2018 | Soon-Shiong | |
| 10,147,113 B2 | 12/2018 | Soon-Shiong | |
| 10,304,073 B2 | 5/2019 | Soon-Shiong | |
| 10,614,477 B2 | 4/2020 | Soon-Shiong | |
| 2006/0047704 A1* | 3/2006 | Gopalakrishnan | G06F 16/58 |
| 2006/0249572 A1 | 11/2006 | Chen et al. | |
| 2006/0259361 A1 | 11/2006 | Barhydt et al. | |
| 2007/0066358 A1 | 3/2007 | Silverbrook et al. | |
| 2007/0288332 A1 | 12/2007 | Naito | |
| 2008/0263458 A1* | 10/2008 | Altberg | G06Q 30/0241 715/757 |
| 2009/0182499 A1* | 7/2009 | Bravo | G01C 21/20 701/408 |
| 2009/0216632 A1* | 8/2009 | Connell, II | G06Q 30/02 705/14.41 |
| 2010/0211506 A1 | 8/2010 | Chang et al. | |
| 2010/0282836 A1* | 11/2010 | Kempf | G06Q 50/188 235/375 |
| 2011/0055049 A1 | 3/2011 | Harper et al. | |
| 2011/0145051 A1 | 6/2011 | Paradise et al. | |
| 2011/0212762 A1 | 9/2011 | Ocko et al. | |
| 2011/0225069 A1* | 9/2011 | Cramer | G06Q 30/06 705/27.1 |
| 2011/0246276 A1* | 10/2011 | Peters | G06Q 30/0223 705/14.24 |
| 2011/0264558 A1* | 10/2011 | Alexandrou | G06Q 20/02 705/26.41 |
| 2012/0054014 A1* | 3/2012 | Cho | G06Q 30/0239 705/14.26 |
| 2012/0109773 A1 | 5/2012 | Sipper et al. | |
| 2012/0229625 A1* | 9/2012 | Calman | G06Q 30/00 348/135 |
| 2012/0230538 A1* | 9/2012 | Calman | G06F 16/583 382/103 |
| 2012/0252359 A1 | 10/2012 | Adams et al. | |
| 2012/0256954 A1* | 10/2012 | Soon-Shiong | G06F 16/9537 345/633 |
| 2012/0259744 A1* | 10/2012 | Ganesh | G06Q 30/00 705/27.2 |
| 2012/0260538 A1 | 10/2012 | Schob et al. | |
| 2013/0030915 A1* | 1/2013 | Statler | G06Q 20/322 705/14.54 |
| 2013/0073377 A1* | 3/2013 | Heath | G06Q 30/02 705/14.39 |
| 2013/0124413 A1* | 5/2013 | Itwaru | G06Q 20/20 705/44 |
| 2013/0179303 A1* | 7/2013 | Petrou | G06Q 30/0623 705/26.61 |
| 2013/0193201 A1* | 8/2013 | Bradley | G06Q 30/0623 235/375 |
| 2013/0293580 A1* | 11/2013 | Spivack | G06K 9/00671 345/633 |
| 2013/0339122 A1* | 12/2013 | Truitt | G06Q 30/0269 705/14.26 |
| 2014/0058812 A1* | 2/2014 | Bender | G06Q 30/0209 705/14.12 |
| 2014/0076965 A1* | 3/2014 | Becorest | G06Q 20/342 235/380 |
| 2014/0100994 A1* | 4/2014 | Tatzel | G06Q 30/0276 705/27.1 |
| 2014/0100997 A1* | 4/2014 | Mayerle | G06Q 30/0276 705/27.2 |
| 2014/0214653 A1* | 7/2014 | Rose | G06Q 20/386 705/39 |
| 2014/0225924 A1* | 8/2014 | Loxam | G06T 19/006 345/633 |

FOREIGN PATENT DOCUMENTS

| | | |
|---|---|---|
| JP | 2003-337903 A | 11/2003 |
| JP | 2004-078385 A | 3/2004 |
| JP | 2005-196494 A | 7/2005 |
| JP | 2005-215922 A | 8/2005 |
| JP | 2005-316977 A | 11/2005 |
| JP | 2006-085518 A | 3/2006 |
| JP | 2006-190099 A | 7/2006 |

(56) References Cited

FOREIGN PATENT DOCUMENTS

JP    2010-224884 A    10/2010
JP    2012-014220 A    1/2012

OTHER PUBLICATIONS

R. Wang, S. Chen, X. Wang and S. Qadeer, "How to Shop for Free Online—Security Analysis of Cashier-as-a-Service Based Web Stores," 2011 IEEE Symposium on Security and Privacy, Berkeley, CA, 2011, pp. 465-480, doi: 10.1109/SP.2011.26. (Year: 2011).*

International Search Report and Written Opinion issued in International Application No. PCT/US2013/034164 dated Aug. 27, 2013, 11 pages.

Office Action issued in Japanese Application No. 2014-558993 dated Sep. 24, 2015, 7 pages.

Office Action issued in Japanese Application No. 2014-542591 dated Feb. 23, 2016, 8 pages.

Office Action issued in Japanese Application No. 2014-542591 dated Jul. 7, 2015, 6 pages.

Supplementary European Search Report issued in European Application No. 13854232.9 dated Jul. 24, 2015, 8 pages.

Supplementary European Search Report issued in European Application No. 12852089.7 dated Mar. 13, 2015, 8 pages.

Zhu et al., "Design of the Promo Pad: an Automated Augmented Reality Shopping Assistant," 12th Americas Conference on Information Systems, Aug. 4-6, 2006, 16 pages.

International Search Report and Written Opinion issued in International Application No. PCT/US2012/066300 dated Feb. 19, 2013, 9 pages.

International Preliminary Report on Patentability issued in International Application No. PCT/US2012/066300 dated Feb. 19, 2014, 12 pages.

Hardawar, "Naratte's Zoosh enables NFC with just a speaker and microphone," Venture Beat News, https://venturebeat.com/2011/06/19/narattes-zoosh-enables-nfc-with-just-a-speaker-and-microphone/, 5 pages.

Monahan, "Apple iPhone EasyPay Mobile Payment Rollout May Delay NFC," Javelin Strategy & Research Blog, Nov. 15, 2011, 3 pages.

* cited by examiner

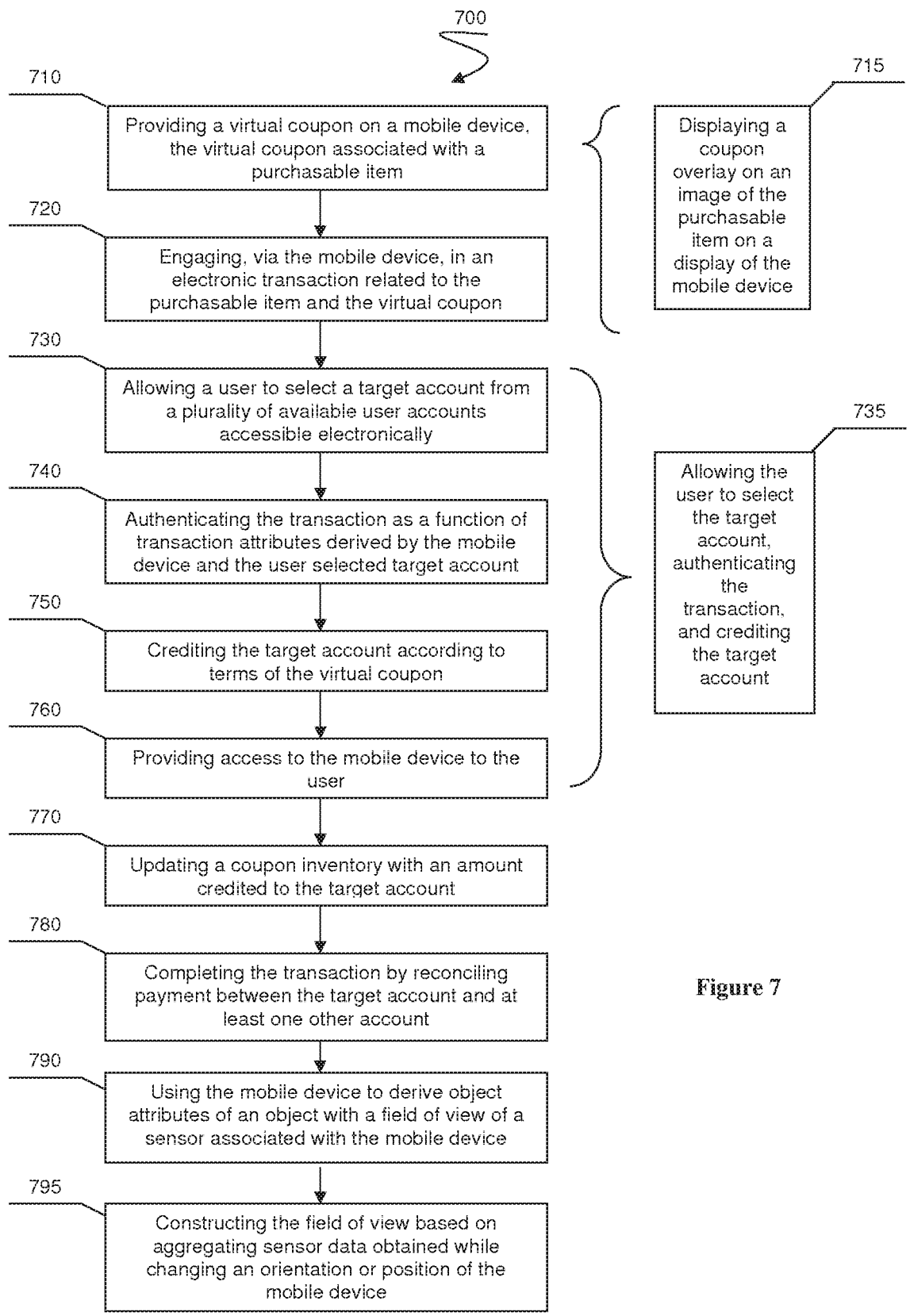

METHODS AND SYSTEMS FOR RECONCILING A TRANSACTION WITHIN A COMPUTER-BASED GAME

This application is a continuation of U.S. application Ser. No. 16/422,901, filed May 24, 2019, which is a divisional of U.S. application Ser. No. 16/173,882, filed Oct. 29, 2018, which is a continuation of U.S. application Ser. No. 15/947,152, filed Apr. 6, 2018, which is a continuation of U.S. application Ser. No. 15/719,422, filed Sep. 28, 2017, which is a continuation of U.S. application Ser. No. 14/359,913, filed May 21, 2014, which is a national phase of International Application No. PCT/US13/34164, filed Mar. 27, 2013, which is a continuation-in-part of International Application Number PCT/US12/66300, filed Nov. 21, 2012, which claims the benefit of priority to U.S. Provisional Application No. 61/562,385, filed on Nov. 21, 2011. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is transaction infrastructure technologies.

BACKGROUND

The background description includes information that may be useful in understanding the present invention. It is not an admission that any of the information provided herein is prior art or relevant to the presently claimed invention, or that any publication specifically or implicitly referenced is prior art.

Transaction systems provide primitive solutions for the ever growing world of on-line transactions. Typically, existing transaction systems provide a single provider the ability to conduct a transaction with a single user. However, they lack the ability to offer providers (e.g., of service, good, etc.) or consumers a system that can reconcile aspects of a transaction among multiple providers or user accounts.

For example, Apple® EasyPay allows a user to make merchant (i.e., Apple®) specific payments in its retail stores in a closed loop system through the user's iTunes® account, thereby eliminating the need to wait in line at a physical counter; see URL: www.javelinstrategy.com/blog2011/11/15/apple-iphone-easypay-mobile-payme rollout-may-delay-nfc/. Another example includes Zoosh®, which uses ultrasound to perform certain near field transactions via two devices; see URL venturebeat.com/2011/06/19/narattes-zoosh-enables-nfc-with-just-a-speaker-and-microphone/).

As another example, U.S. Patent Application Publication No. 2012/0252359 to Adams et al. teaches a mobile device having a motion sensing device and a processor configured to, among other things, recognize a movement pattern and, based upon that movement, determine a payment account from which access information for the payment account is sent to a transaction terminal via an NFC device of the mobile device.

Unfortunately, known existing transaction systems apparently fail to reconcile aspects of a transaction among multiple provider accounts or user accounts. Moreover, known existing transaction systems apparently fail to reconcile aspects of a transaction based at least in part on derived object attributes. Thus, there is still a need for transaction systems capable of reconciling aspects of a transaction among multiple provider or user accounts.

SUMMARY OF THE INVENTION

The inventive subject matter provides apparatus, systems and methods in which one can conduct a transaction involving multiple accounts (e.g., provider accounts or user accounts) that are involved with a payment (e.g., of cash, coupon, discount, loyalty points, etc.) or any other suitable transaction associated to an item (e.g., good, service, subscriptions, etc.). As used herein, the term "provider" is used very broadly to include providers of a service or good, whether real or virtual, One aspect of the inventive subject matter is considered to include a transaction system comprising a recognition engine, a transaction engine, and possibly one or more device engagement engines. The recognition engine can obtain a digital representation of a real-world object and derive attributes associated with the object (e.g., time, location, color, shape, model, cost, price, available coupons, messages, metadata, etc.) based on recognizing the object. A transaction engine can communicate with the recognition engine and can reconcile a transaction among multiple provider accounts or user accounts as a function of one or more of the derived object attributes. In some preferred embodiments, the transaction involves making a payment to one or more of the provider accounts or user accounts where the payment relates to an item. In some embodiments, an engagement engine can cause a computing device (e.g., cell phone, set-top box, kiosk, game consoles or system, etc.) to take action based on the transaction. Actions will be discussed in greater detail below.

In one aspect of the inventive subject matter, the transaction engine can comprise a memory storing one or more reconciliation matrices. In such embodiments, the transaction reconciliation engine can be configured to associate one or more object attributes (derived by the object recognition engine) with a recognition signature. The recognition signature can be stored in a signature database communicatively coupled to the transaction reconciliation engine and object recognition engine.

It is contemplated that a "recognition signature" can comprise a collection of values associated with certain attributes within an interaction space, which can either be manually generated by a user, provider or third party, or constructed based on historical actions of one or more users. Where a derived object attribute or attributes meet a set of criteria associated with the signature, the object attribute(s) can be associated with the signature. The criteria can comprise mandatory requirements (e.g., the presence of an attribute, a threshold, the presence of a first attribute and a second attribute, etc.) or optional conditions (e.g., the presence of a first attribute or a second attribute, etc.).

The transaction recognition engine can also be configured to map a recognition signature to a plurality of transaction accounts via one or more reconciliation matrices in a memory.

As used herein, the term "reconciliation matrix" can comprise an algorithm, a lookup table, or any other suitable rules set or data structure that can be utilized in mapping a recognition signature to one or more accounts.

Where, inter alia, the reconciliation matrix is utilized in mapping a recognition signature to multiple accounts, it is contemplated that the transaction reconciliation engine can be configured to reconcile a transaction among the multiple accounts.

From a methods perspective, a transaction can be initiated via a mobile device or other computing device. A mobile device can obtain a digital representation of a real-world object via a sensor. The digital representation can be transmitted by the mobile device to an object recognition engine configured to recognize the real world object and derive one or more attributes of the object. The mobile device can cause various actions to be performed by a transaction reconciliation engine, which can optionally be installed in the mobile device. Among the actions that can be performed by the transaction reconciliation engine are (a) associating an object attribute with a recognition signature, (b) mapping the signature to one or more transaction accounts via a reconciliation matrix, and (c) reconciling a transaction related to an item associated with the real-world object among the accounts.

Upon completion of the transaction, the mobile device can receive a notification associated with the complete transaction. It is contemplated that a notification can be received or presented to a user in any commercially suitable manner, e.g., via an email, a push notification, etc.

Another aspect of the inventive subject matter includes a method of reconciling payment of a coupon. Contemplated methods include using a recognition engine, possibly deployed on a mobile cell phone or other computing device, to recognize a real-world object related to a purchasable item. The purchasable item could be the same item as the real-world object (e.g., a product on a store shelf) or tangentially related (e.g., a ticket of a movie displayed in on a movie poster). The method can further include creating a virtual coupon based on attributes derived from a digital representation of the real-world object where the digital representation could comprise image data, sound data, non-visible data, signals, or other modal types of data. Another step can include activating the virtual coupon upon a triggering event generated by a mobile device, a cell phone for example. The triggering event could be generated automatically, "zero touch" (e.g., via near field communications, recognition of an object, etc.), or manually via one, two or more user interactions with a user interface. With zero touch generation of a triggering event, it is contemplated that a device can be configured to recognize objects located as far as 1, 5, 10, 20, 50, 100 or even 1000 or more feet away. Less clicks or user interface interactions can be preferable over a larger number of interactions. The mobile device, or other electronic device involved in the transaction, can reconcile the transaction among two or more electronic accounts relating to the purchase of the purchasable item. For example, a coupon vendor account can be charged according to terms of the virtual coupon, a vendor account can be credited with payment, a consumer's account can be charged according to terms of the virtual coupon, or a consumer's account can be credited according to terms of the transaction or virtual coupon. In some embodiments, the accounts can be third party accounts associated with various loyalty programs possibly participating in a loyalty exchange system where one account currency (e.g., frequent flyer miles, free gasoline points, etc.) can be converted to another (e.g., virtual gold in an on-line game, mobile phone minutes, etc.) according to terms of a virtual coupon.

Yet another aspect of the inventive subject matter can include a transaction apparatus (e.g., cell phone, point of sales device, computer, server, kiosk, game console, etc.) that can include a sensor interface through which the apparatus can acquire a digital representation of a real-world object or scene having the object. Example sensor interfaces could include an actual sensor (e.g., UPS, microphone, camera, accelerometer, bio-metric, etc.), a hardware interface to a sensor platform (e.g., serial interface, parallel interface, network interface, USB, etc.), or even a set of application program interfaces (APIs) capable of making local or remote procedure call. The transaction apparatus can also include a recognition module communicatively coupled with the sensor interface where the recognition module derives one or more object attributes from the digital representation and uses the object attributes to identify a purchasable item (e.g., the real-world object, a good, a product, a service, a subscription, etc.). Contemplated apparatus can further comprise a virtual coupon generator configured to generate a virtual coupon associated with the purchasable item as a function of the object attributes or other information available (e.g., customer ID, phone number, vendor ID, merchant ID, account numbers, prior consumer transactions, prior consumer scans, prior consumer interactions, etc.). The transaction apparatus can further include a transaction interface configured to electronically engage, directly or indirectly, one or more accounts possibly over a network. The transaction interface allows the apparatus to reconcile an account based on a payment for the purchasable item and based on use or authentication of the virtual coupon. In especially preferred embodiments, a user account is credited for purchasing the item. One especially preferred embodiment includes a mobile phone operating as the transaction apparatus where the virtual coupon is specifically generated according to a location and time.

Still another aspect of the inventive subject matter includes a method of mitigating risk of transaction fraud associated with a coupon. The method includes providing a virtual coupon on a mobile device (e.g., cell phone, vehicle, car, airplane, mobile kiosk, point of sales device, etc.,) where the coupon relates to a purchasable item, possibly identified from object attributes derived from a digital representation of a scene. The virtual coupon can be provided via a text message, an email, a pop up, or any other commercially suitable method. The mobile device can further engage in an electronic transaction locally or even over a network with one or more account servers. The device can further allow the user to select at least one target account to be involved in the transaction from multiple accounts available for use with the transaction. The method can further include authenticating the transaction as a function of transaction attributes derived by the mobile device, possibly from the digital representation (e.g., location, time, make, model, consumer ID, device ID, etc.), as a function of the user selected target account, as a function of virtual coupon properties, or other factors. In more preferred embodiments, the method includes crediting the target account according to the terms of the virtual coupon. For example, a user might purchase a television at full price and might receive a virtual coupon from the television manufacturer that allows the user an option to credit a number of miles to a frequently flyer account or to credit their cell phone account.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

FIG. 7 shows a flowchart of a method of mitigating risk of transaction fraud.

DETAILED DESCRIPTION

Figure 1:
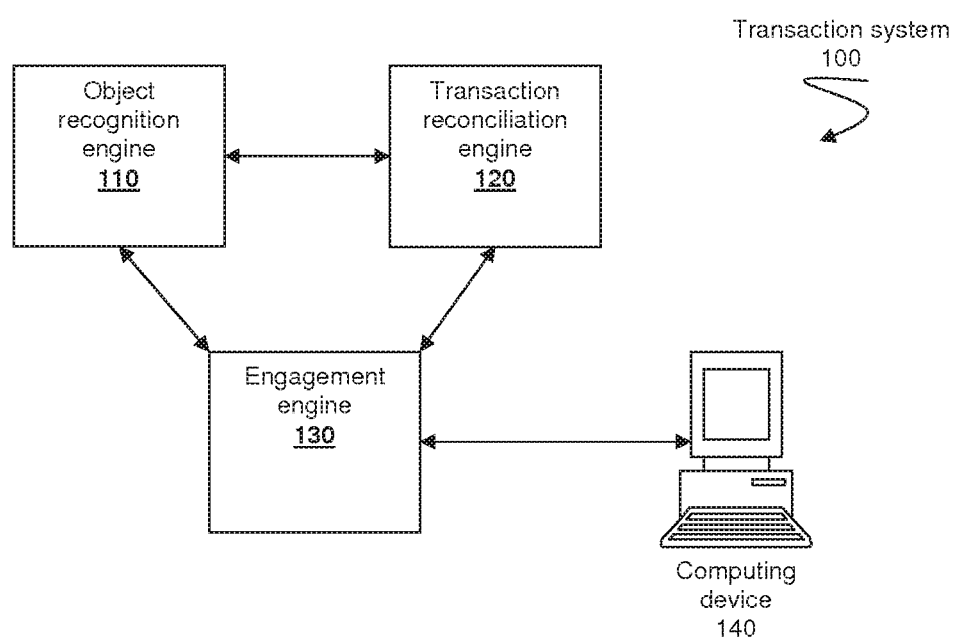
FIG. 1 shows an overall ecosystem of a transaction system of the inventive subject matter.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

It should be noted that while the following description is drawn to a computer/server based transaction/recognition systems, various alternative configurations are also deemed to represent computing devices including servers, interfaces, systems, databases, agents, peers, engines, controllers, or other types of computing devices operating individually or collectively. One should appreciate the computing devices comprise a processor configured to or programmed to execute software instructions stored on a tangible, non-transitory computer readable storage medium (e.g., hard drive, solid state drive, RAM, flash, ROM, etc.), The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

One should appreciate that the disclosed techniques provide many advantageous technical effects including providing an infrastructure capable of generating networked signals that cause remote devices to engage in reconciling accounts among one or more provider or user accounts.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously, Within this document, "coupled with" can also mean "communicatively coupled with", possibly over a network.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

It is contemplated that the inventive subject matter described herein can leverage one or more techniques, including object recognition techniques, disclosed in the following co-owned applications: U.S. provisional application No. 60/246,295 filed Nov. 6, 2000; U.S. provisional application No. 60/317,521 filed Sep. 5, 2001; U.S. application Ser. No. 11/510,009 titled "Interactivity Via Mobile Image Recognition" filed on Aug. 25, 2006; U.S. application Ser. No. 12/505,726 titled "Interactivity with a Mixed Reality" filed on Jul. 20, 2009; U.S. application Ser. No. 13/005,716 titled "Data Capture and Identification System and Process" filed on Jan. 13, 2011; U.S. application Ser. No. 13/037,317 titled"Image Capture and Identification System and Process" filed on Feb. 28, 2011; and U.S. application Ser. No. 13/037,330 titled "Object Information Derived from Object Images" filed on Feb. 28, 2011. For example, the inventive subject matter can utilize one or more of the techniques for presenting information such as Internet content to a user described in U.S. application Ser. No. 13/005,726.

FIG. 1 shows an overall ecosystem of a transaction system of the inventive subject matter. Transaction system 100 (e.g., a subscription service, etc.) comprises an object recognition engine 110, transaction reconciliation engine 120, engagement engine 130, and computing device 140.

Object recognition engine 110 is configured to recognize a real-world object and derive object attributes of the object. The "real-world object" can comprise any existing still or moving object, including for example, a poster, a magazine, a brochure, a billboard sign, a product, a purchasable product, a vehicle, a storefront, a food item, a logo, a trademark, an image on a screen (e.g., television or computer screen, etc.), a person providing a service, a person, an image of a good or service (e.g., an image in printed media, non-printed media, an image of an animated object, an image of an inanimate object, etc.), a street sign, a 2D object, a 3D object, a time-varying object (i.e., 4D object), or a service embodied in a tangible medium. In some preferred embodiments, the real-world object is related to a purchasable product or service. The object attributes can comprise any quality or feature of an object, including for example, an absolute time, a relative time, a response time, a location, a relative position or orientation, a color, a size, a quantity, a quality, a material, an availability, a depreciation rate, an appreciation rate, a supply relative to a demand, a shape, a make, a model, a cost, an available coupon, a message, metadata, and a price. Additional details regarding object recognition engines will be provided in the description of FIG. 2.

Transaction reconciliation engine 120 can be communicatively coupled to object recognition engine 110 and configured to reconcile a transaction amongst two or more provider accounts or user accounts as a function of the attributes derived by object recognition engine 110. The transaction can include, among other things, a purchase, a download, an order, a pre-order, a reservation, a down payment, a pre-payment, a partial pre-payment, reconciling a coupon among at least one of a provider account associated with the transaction and a user account, or any other suitable transaction. Reconciling a coupon can include, among other things, at least one of the following steps: (1) identification of a coupon to be generated; (2) generation of a coupon; (3) providing a coupon to a user; (4) a user receiving a coupon; (5) a user presenting the coupon to a provider or point-of-sale terminal (e.g., via a text, entail, a closeness of a device to a point of sale device, a presenting of a displayed virtual coupon, a presenting of a code or password associated with the virtual coupon, etc.); and (6) reconciling at least one account (e.g., user, provider, etc.) via a credit, debit, update, notification, etc.

In some embodiments, the transaction can involve some sort of payment to at least two different accounts, for the purpose of obtaining a good, product, service, or subscription. Moreover, the transaction can be completed in no more than 10, 5, 3, or even 2 or less physical interactions. For example, it is contemplated that an end user can capture an image of a real world object via a single click of a device, and that this single click can initiate some or all of the steps of a transaction related to the object, which can include reconciliation of a coupon. It is also contemplated that the transaction can occur automatically based on a real-time automatic ambient collection of sensor data forming a digital representation of the real-world object without requiring the end user to initiate the transaction. For example, the digital representation of the real-world object can automatically be compared with objects or items within a database. This database can be located in a server located within the device collecting sensor data, a remote server, or any combination thereof. Additional details regarding transaction reconciliation engines and the process of reconciling a transaction will be provided in the description of FIG. 3.

Engagement engine 130 is communicatively coupled to object recognition engine 110, transaction engine 120 and computing device 140, and is configured to cause computing device 140 to take one or more actions as a function of a transaction. All commercially suitable computing devices are contemplated, including for example, a mobile phone, gaming console or system (including 3-D gaming consoles and systems), a local server, a remote server, a general purpose computer, a tablet, a kiosk, an electronic device, a set-top box, a vehicle, or any other commercially suitable device. Examples of actions that can be caused by engagement engine 130 include, among other things: (1) a credit or a debit where the computing device comprises a bank server; (2) an initiation of a software process, posting data, reading data, logging on or off an account, registering an account, interacting with a game where the computing device comprises any one of several suitable computing devices; (3) an initiation of a transaction where the computing device comprises a point-of-sale device; or (4) making a phone call (e.g., to a doctor, store, etc.) where the computing device comprises telephony capabilities.

One contemplated type of transaction system can be configured to modify a subscription bill from a service or product provider (e.g., a utility provider, a magazine subscription provider, etc.). Modifying a subscription bill can include, among other things, at least one of a deletion of a charge, a reduction of a charge, an increase of a charge, an overall percentage discount, a credit, a free offer, a reduced price offer, or a coupon for a service or a good. The system can establish a universal framework of a virtual loyalty card usable by multiple providers based on object recognition of a real world object. A recognition engine of such systems can recognize the object, derive object attributes associated with the object, and recognize an ID of a virtual coupon in the process of recognition of both the object and of the virtual coupon of the real world object. The recognition engine can then engage a transaction engine to initiate a transaction associated with the object (e.g., a purchase of the object, etc.), and redeem the coupon by crediting the provider's monthly statement, or other provider or user account. A final reconciliation among providers can occur on a weekly basis, monthly basis, yearly basis, one-time basis, or any other recurring or non-recurring time period.

For example, a user can be assigned a single loyalty ID, loyalty card, or account number. When the user interacts with an object such as a poster via his mobile phone, he can be provided with a link to a website selling the poster. Based on at least one of the user's clicking on the link, saving the link, or making a purchase at a website associated with the link, a credit can be made to a loyalty account associated with the link or website. If the same user interacts with an image of Disneyland, and is automatically redirected to a website where the user purchases airplane tickets to Florida, a credit can automatically be made to a loyalty account associated with the airline or a credit card used to purchase the airplane tickets with frequent flyer miles, etc.).

Coupon redemption by providers can occur upon confirmation of payment even before a payment is received (e.g., during the period wherein a credit card payment has been authorized but funds have not yet been received by the provider(s)). One should appreciate the reconciliation can occur based on a recognition of the real world object, generation of virtual coupon, entering into virtual loyalty card, and a purchase or redemption being complete in less than 2 steps. These steps can each occur on a single mobile device (or multiple devices), in real or substantially real time in the real world. In some embodiments the reconciliation can occur in real or substantially real time through collection of ambient sensor data or at a point of sales. Thus, various provider and user accounts can be credited or debited based on their loyalty activity.

An additional aspect of the inventive subject matter includes a system to allow users to pay a provider to receive a service e.g., telephone, utility, magazine or newspaper subscription, car lease etc.) by redemption of coupons obtained via a purchase of real world objects or services different from the first service. This can be achieved by utilizing a recognition and engagement engine in at least one of a device and a server. For example, a user who purchases a telephone at AT&T™ can be sent a coupon, via text or email, which the user can redeem to receive a free month of telephone service through Verizon™.

Figure 2:
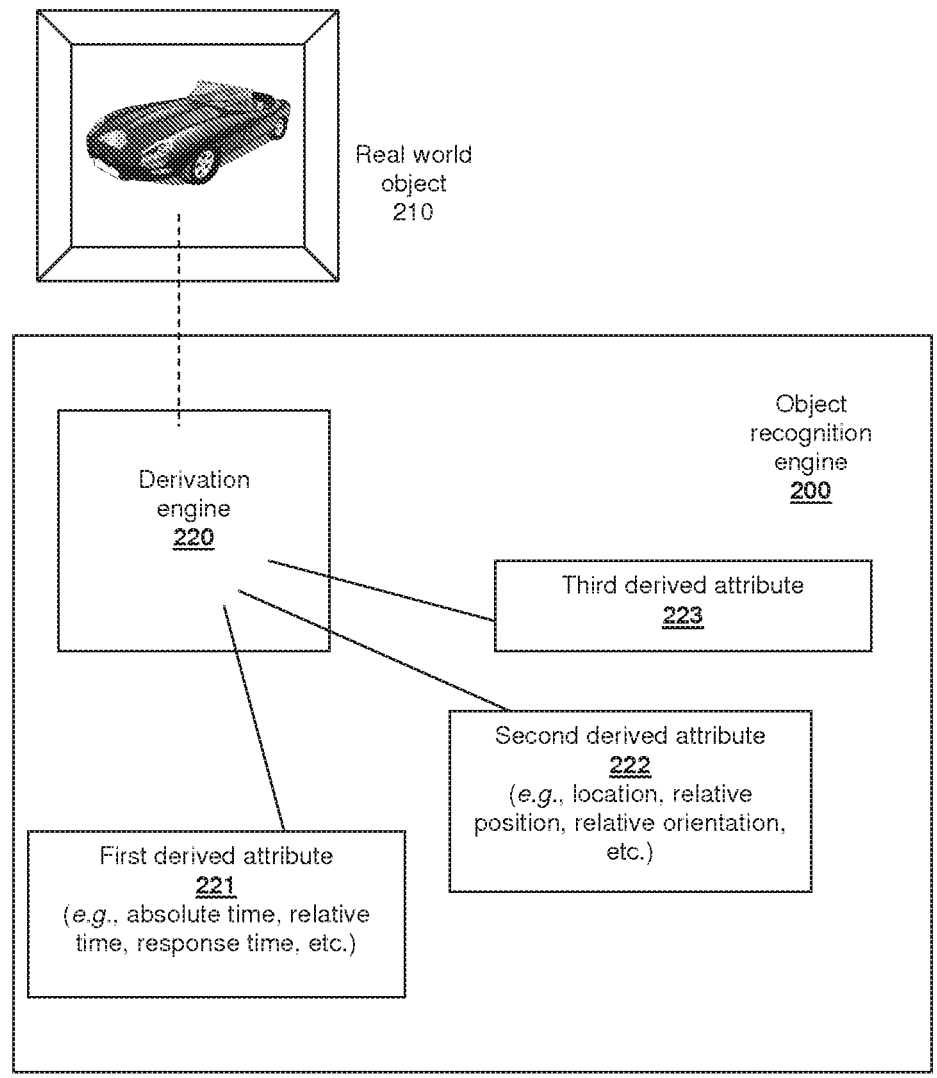
FIG. 2 shows an object recognition engine deriving attributes related to a real world object.

FIG. 2 shows one embodiment of an object recognition engine of the inventive subject matter that is configured to obtain a digital representation of a real-world object and derive attributes associated with the object. In this example, real world object 210 is representative of both a product and a service, and is an image of a car. Real world object 210 is representative a product insofar as an item associated with the object (e.g., the car, a car part, etc.) can be purchased, leased, physically destroyed, enhanced or other modified, or rented. Real world object 210 further is representative of a service insofar as it is associated with a driving or other service (e.g., a taxi service, limousine service, etc.).

Object recognition engine 200 comprises a derivation engine 220 that is configured to derive one or more object attributes (e.g., 221, 222, and 223) of real world object 210. Derivation engine 220 can be configured to derive 5, 10, 15, 20, 25, 50, or even 100 or more object attributes for every real world object it scans or recognizes. The derived attributes can be organized hierarchically by class, category, or even dimensions within an interaction space. As discussed above, the object attributes (e.g., 221, 222, and 223) can include, among other things, an absolute tune, a relative time, a response time, a location, a relative position or orientation, a color, a size, a quantity, a quality, a material, an availability, a depreciation rate, an appreciation rate, a supply relative to a demand, a shape, a make, a model, a cost, an available coupon, a message, metadata, and a price.

Some or all of the derived attributes can be derived from visible data, and others derived from non-visible data. It is also contemplated that a single attribute can be derived from both visible and non-visible data. Examples of visible data include, for example, digital representations of a size, a color, a shape, a location, a brightness, a material, a shadow, a relative size, a relative color, a relative shape, a relative location, or a relative brightness. Examples of non-visible data include, for example, digital representations of a sound, texture, touch, sensed emotion, taste or smell.

Figure 3:
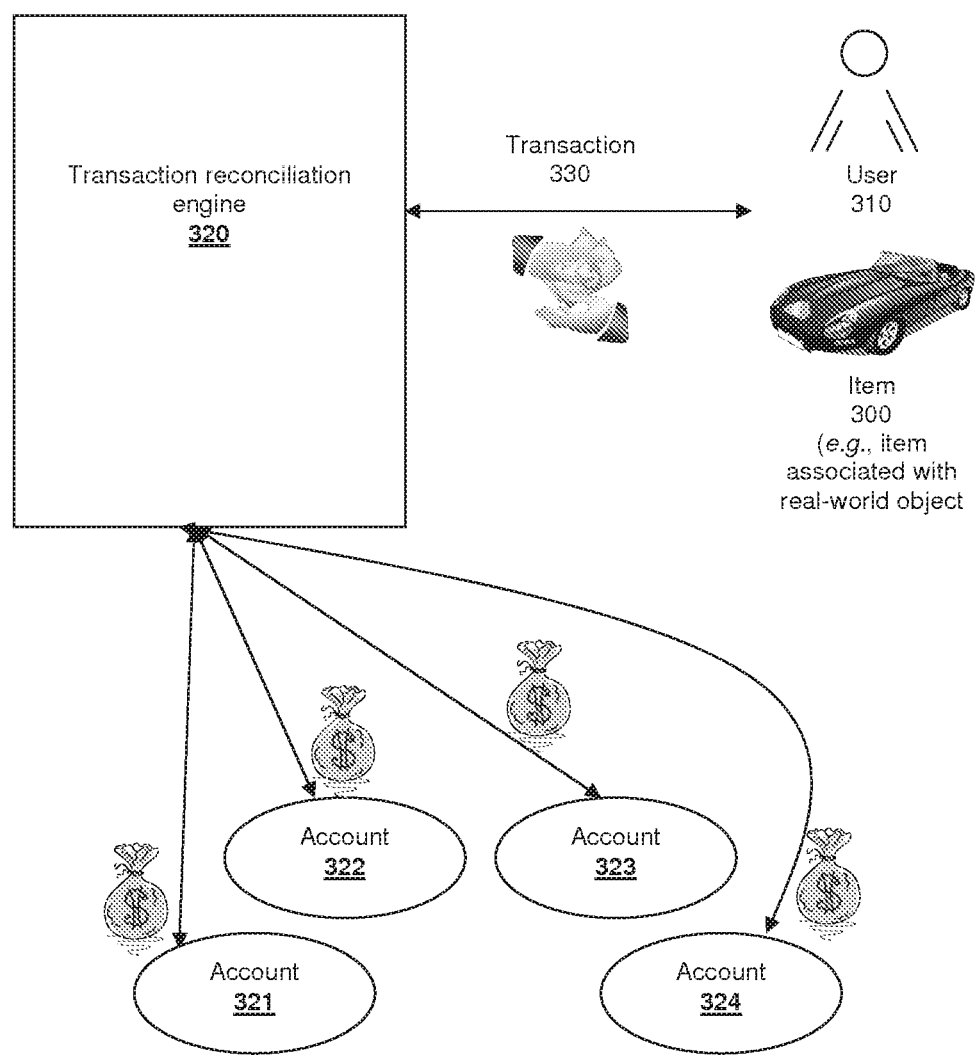
FIG. 3 shows a transaction reconciliation e reconciling a transaction among multiple accounts.

FIG. 3 shows a transaction reconciliation engine of the inventive subject matter that is configured to reconcile a transaction related to a real world object or an item associated with the real world object. As used herein, an "item associated with a real world object" can comprise a good, product, subscription, real coupon, virtual coupon, or a service (e.g., a utility, reservation, game, etc.). The transaction is reconciled among a plurality of accounts as a function of one or more of the attributes derived by an object recognition engine.

Item 300 is a car associated with object 210, which is an image of a car very similar to item 300. User 310 captures a digital representation of object 210 via a camera enabled mobile phone. Object recognition engine 220 obtains the digital representation captured by user 310, recognizes object 210 as a real world object, and derives various attributes thereof, including a make, model, year of manufacture, and color of object 210. Object recognition engine 220 then causes information related to item 300 to be presented to the user, either via the mobile phone used to capture the digital representation or a remote device. The information related to item 300 can be a video showing item 300, an accident history, a repair history, miles driven, a location, a price, an availability, and a transaction link (e.g., a link to a website where the item can be purchased).

In this example, user 310 clicks on a link to a website where the item can be purchased, and engages in a transaction 330 that comprises a payment to four accounts, 321, 322, 323 and 324, related to item 300. This payment to the four accounts can be a lump or partial payment, and can be direct or indirect. For example, a user can make a lump complete) or partial payment indirectly via a third party collector. A lump payment can be distributed amongst the various accounts, while a partial payment can be distributed to a specific account, or two or more accounts. It is also contemplated that the user can also make lump or partial payments directly to the accounts themselves. A direct payment can be a payment between a consumer and a provider, which is limited to the inclusion of two or more of the following: entities associated with the user account; entities associated with the provider account; the use of a transaction system of the inventive subject matter; and transaction reconciliation engine of the inventive subject matter. An indirect payment can comprise any other payment and can include a third party entity.

When user 310 purchases item 300 via the website, user 310 provides user account information to transaction reconciliation engine 320, either directly or via a third party payment processor (not shown). This user account information can include, for example, at least one of a name, address, expiration date, login username, login password, consumer ID associated with an application, account number, a name of a financial establishment, a type of account (e.g., Visa™, Mastercard™, Discover™, American Express™, etc.), or a confirmation of a payment or authorization of a payment made by a remote server or third party.

Upon at least one of the following: receipt of user account information; confirmation of correctness or completeness of user account information; processing a payment associated with user account information; authorization of a payment associated with user account information; and receipt of a payment associated with user account information, transaction reconciliation engine 320 can reconcile the transaction among accounts 321, 322, 323, and 324.

The following use case describes a reconciliation of a payment by the embodiment in FIG. 3. User 310 makes a payment to a third party payment processor (not shown) of $10,000 USD for the purchase of item 300 according to the information provided via object recognition engine 220. To make this payment, user 310 provides the third party payment processor with a credit card authorization form approving the processing of a $10,000 USD payment. The third party payment processor processes the payment and provides a confirmation of the payment to transaction reconciliation engine 320. Transaction reconciliation engine 320 then reconciles the transaction among accounts 321, 322, 323, and 324 by distributing the payment amongst them. Account 321 is associated with the previous owner of item 300, who receives a payment of 60% ($6,000 USD). Account 322 is associated with the car dealership storing item 300, who receives a payment of 20% ($2,000 USD). Account 323 is associated with a magazine who has been advertising item 300 for sale, who receives a payment of 10% ($1,000 USD). Account 324 is associated with the host of transaction reconciliation engine 320 or the system it composes, who receives a payment of 10% ($1,000 USD). In this manner, transaction reconciliation engine 320 allows users to pay multiple entities via a single payment.

It is also contemplated that in some embodiments, the transaction reconciliation engine can perform some or all of the functions of a third party payment processor. Thus, transaction reconciliation engine 320 can also allow providers to receive their portions of a payment efficiently and immediately without having to transact directly with user 310.

Figure 4A:
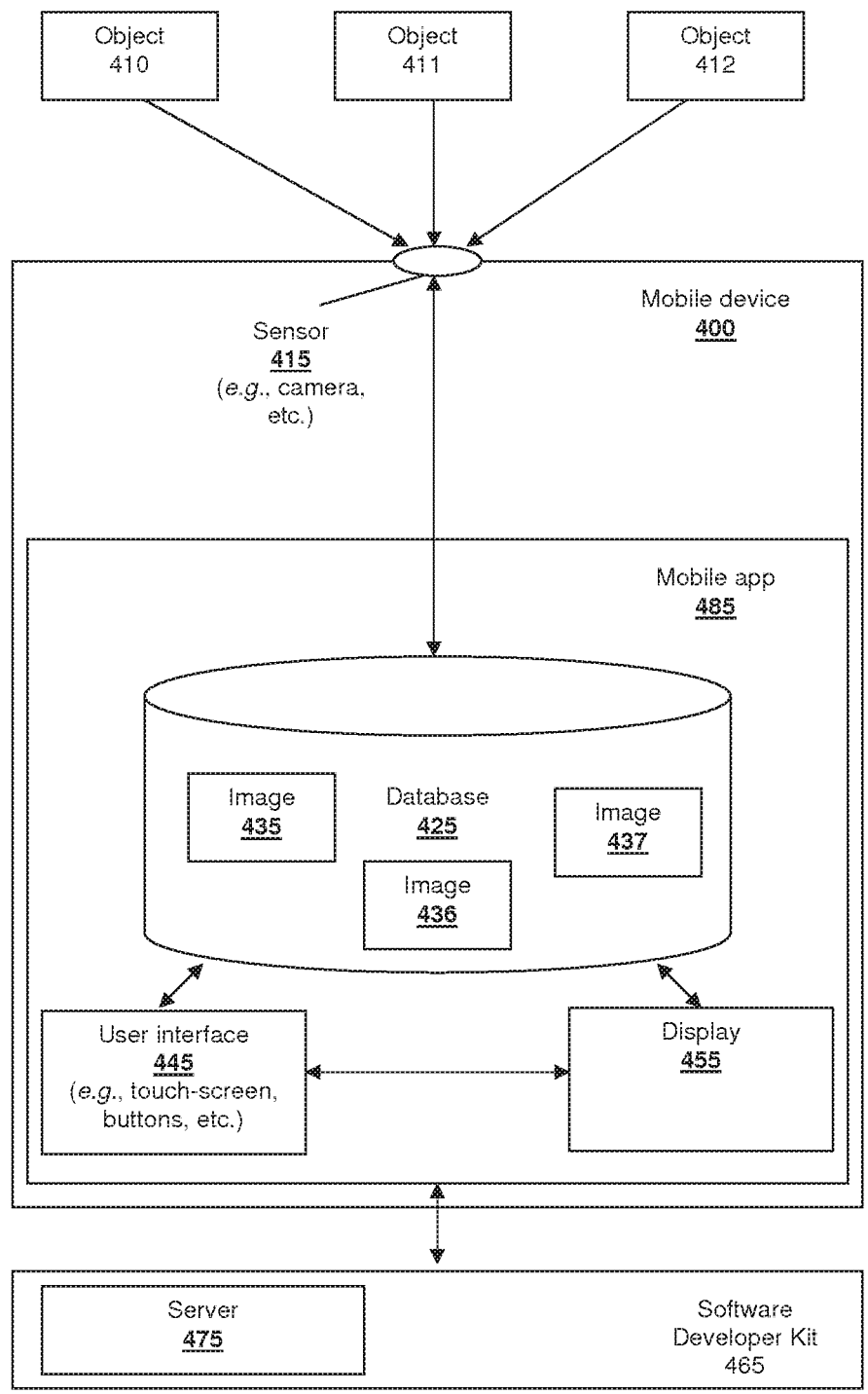
FIG. 4A shows an embodiment of the inventive subject matter as embodied in a mobile device application.

In some embodiments, as shown in FIG. 4A, a Software Developer Kit (SDK) 465 can be provided to developers of client-side applications (e.g., software, cell phone apps, cloud-based services, etc.). SDK allow developers to configure mobile devices (e.g., 400) to recognize real world 3D objects (e.g., 410, 411 and 412) in real-time based on comparing imagery captured by a device camera with a database (e.g., 425) of images (e.g., 435, 436, and 437) stored in the device. This can eliminate the latency involved in sending images to the server and thus can enable real-time identification of objects within the camera field of view as a user waves the device across his environment. This mode also eliminates the need for a user to "snap" an image since recognition is operating continuously in the mobile device, thus allowing a user to engage in a transaction without requiring the user to take actions via a user interface. Preferably the user can conduct a transaction via a user interface (e.g., 445) with no more than three or two user interface interactions, more preferably no more than one user interface interaction, or yet more preferably automatically without any user interface interactions. Example techniques that can be deployed in a recognition module include SLAM, vSLAM, SIFT, BRISK, VIPR, or other techniques.

On the client-side, image recognition services also can provide real-time tracking and augmented reality overlays on identified objects. These augmented reality overlays can comprise 21) content (e.g., HTML) or 3D animated models. In either case, the augmented reality overlays can be aligned with or track the recognized object, in real-time, in the mobile device screen. The overlay content can be accessed via network or can be resident in the handset to minimize latency. In some embodiments the overlay can include a virtual coupon constructed, possibly in real-time. In some embodiments the overlay can include an advertisement, informational text, link to a website, or any other commercially suitable overlay.

The client-side image recognition services or modules can also provide real-time data describing the relative position or orientation of a tracked object. The position or orientation of objects 410-412 can be presented relative to the user, relative to mobile device 400, relative to each other, or according to other desired formats.

The client-side recognition technology can be optimized to produce a smooth and robust user experience. For example, on an iPhone® 4, the Applicant's object recognition system is able to operate easily at a rate of 10 video frames per second, where post-recognition augmented reality object tracking is able to operate at 30 frames per second.

Images in the client-side database can have an average size of approximately 30 KB. A typical smart-phone can therefore accommodate a database of thousands of images.

Several options are available for loading and updating the client-side database. This includes: "User Pull", wherein the user initiates a database update by performing an action such as checking in to a retail store, selecting a product category, and so forth. A client app, via the SDK 465, then downloads images related to the user's action from the SDK server 475; and "Automatic Push", wherein the SDK server 475 automatically sends database updates to the app 485, based on any set of desired conditions, e.g. the user's location, time, actions taken within an app, local deals, coupons, or other promotions. If the database is running out of storage space, the application can be configured to automatically delete images or data from the database, preferably based on a prioritized basis (discussed further below).

In addition to server-side and client-side image recognition, the platform can also support a hybrid mode in which initial image recognition is performed by a server but augmented reality processing is performed by the client. This hybrid mode enables use of a virtually unlimited database size and eliminates the need to update the client-side database, while providing for augmented reality. This hybrid mode can cause initial delay of a few seconds between capturing a digital representation of a scene and the start of the augmented reality experience. During that delay the initial image is sent to the server, analyzed, and the augmented reality content can be sent to the client.

The client-side image recognition SDK can provide direct programmatic access to all object recognition and tracking functions (e.g., vSLAM, VIPR, SIFT, GPS information, time stamps, etc.). The SDK can include a complete detailed function library, for use by developers familiar with image recognition, and a simplified function library that is useful for those without an image recognition background.

The client SDK can also include support for the Unity® game development environment. 3D models developed in that environment are compatible with the augmented reality functionality in the SDK.

Example SDK Use Cases

The following use cases provide various examples of some aspects of some embodiments of the inventive subject matter.

Merchant and Consumer Applications for Redeeming a Coupon

In some embodiments, a merchant or other provider can utilize a merchant application developed via an SDK. A transaction system associated with the merchant can have certain templates, which the merchant can provision with pricing and coupons or other forms of benefits. The merchant can open the merchant application, log in with his or her merchant (which can be set up through a third party), and scan one or more objects by capturing an image, scanning a barcode or other symbol, via near field communications, etc. The merchant can also provision the system or application (if there are templates), or simply input pricing and coupon/benefits information, which can be saved to the system.

From a user perspective, the user can walk into the merchant's store and engage the system by opening a consumer application developed via an SDK. The user can log in to the consumer application with his or her consumer ID (e.g., account number, loyalty card number, etc.) and scan items to view coupons/savings. The consumer can select a coupon or saving, take an item associated with the coupon to a merchant checkout counter or person and redeem the coupon.

When a merchant is presented with a coupon, the merchant can open the application and log in with his or her merchant ID. The merchant can obtain a phone number or other information associated with the consumer and input it into the application. It is contemplated that the merchant will be able to view the coupons selected by the consumer in the merchant's application. The merchant can apply the coupon selected using various methods. First, the user can apply the coupon within the merchant application if POS is enabled and the consumer is set up for payment (e.g., via ClearXchange™). The merchant can receive confirmation of payment processing and obtain an electronic receipt, including a merchant service charge, if any. Second, the merchant can apply coupons to the consumer bill manually with his or her existing payment system. Third, the merchant can enter the total charge to an existing payment system and savings associated with the coupon(s) can be applied to the consumer's mobile phone carrier phone bill (e.g., Verizon™, AT&T™, etc.). The consumer can receive a text, app, or email notification that the coupon(s) were applied, along with what payment option was used. The merchant and consumer can have access to all transaction online, including details of coupons/savings received, and via which method(s), among other things.

Consumer Identification, Interests and Recommendations

A consumer utilizing a transaction system of the inventive subject matter (e.g., a SDK generated application installed in his mobile device) can obtain various recommendations, coupons, etc. based on objects or items associated with the consumer. It is contemplated that systems of the inventive subject matter can achieve at least one of the following: (1) identify a consumer, (2) identify what objects with which the consumer interacts or transacts, or (3) identify what objects and items would be of interest to the consumer.

The following use case shows some of the benefits the system can provide a consumer walking through a shopping center. Prior to entering the shopping center, the user can open up the consumer application and log in using his unique consumer ID and possibly a password. The system will identify the consumer and begin to store and prioritize data associated with the consumer.

For example, when a user walks into a specific store, sensor data can automatically be acquired and an interest in the store can be identified by the system. This identification can be based on one or more of the following, among other things: a recognition that the consumer entered the store; the amount of time the consumer spent in the store, the number of items purchased in the store; or the amount of money spent in the store.

The prioritization of actions or items based on acquired data can be based upon any suitable scoring or ranking system, which can be determined by a user of a device, a transaction system manager, or an SDK of the inventive subject matter. For example: a user can assign certain values to certain types of actions associated with an item (e.g., a download of a song can be worth 2 points being assigned to the musician, while a purchase of a physical product can be worth 4 points being assigned to a person associated with the product, etc.); a transaction system manager can assign a range of scores that determine a level of interest (e.g., basic level of interest between 1-10, moderate level of interest between 11-20, special level of interest between 21-30, superior level of interest between 31-40, etc.), and an SDK can modify the user assigned values of certain types of actions or data based on user activity.

One possible scenario where an SDK can modify the user assigned value of an action can be where a user assigns a high value to an action (e.g., 4), but then repeatedly declines offers presented to the user based on items associated with the action. In such a scenario, the SDK could lower the value assigned to the action (e.g., to 2).

For example, when a consumer walks by a movie advertisement in the store, the movie advertisement can automatically be scanned, and sensor data automatically obtained. The system can then identify that the movie is of the consumer's basic level of interest and prioritize the movie poster accordingly. Based at least in part on the priority given to the movie poster, the user's device can present information or options to the user (e.g., to purchase movie tickets, download a trailer, etc.), or initiate transactions related to the movie poster.

This identification of the movie as being of the consumer's basic level of interest can be based on a score of, for example, between 1-10 (e.g., 8) being associated with a director of the film. The system can also possibly recognize an actor, director, producer, filming location, or any other feature of the movie advertised and prioritize those features accordingly. If an actor in the poster is then recognized as being of the consumer's higher level of interest, it is contemplated that the scores of two identified objects of interest can be averaged. Thus, if the actor is recognized as being of the consumer's moderate level of Interest (e.g., score between 11-20), a special level of interest (e.g., score between 21-30), or a superior level of interest (e.g., score between 31-40), then the average of the scores can be used to determine a level of interest of the movie.

Alternatively or additionally to prioritization based on features of the object, it is also contemplated that a scoring or ranking system can be associated with actions of a user, and that these actions can be used to determine a type of desired transaction. For example, it is contemplated that a scoring or ranking system can be set in place that recognizes that the consumer wishes to initiate a certain type or types of transactions with the movie advertisement based on the consumer capturing an image of the object, or simply standing in front of the advertisement for a specified threshold time 2, 5, 10, 15, or even 20 or more seconds). These actions of a user can be used to recognize a level of interest in the object (e.g., basic, moderate, special, superior, etc.). The consumer can then be provided with a link to a website that provides information related to the movie (e.g., show times, location of a DVD in the store itself, etc.) or allows the consumer to purchase movie tickets, DVD, movie poster, or soundtrack.

If the consumer chooses to in fact engage in a transaction (e.g., downloading a trailor, etc.) associated with the object by clicking on this link, the system can identify that a transaction related to the movie occurred and assign a higher priority to the movie than other movies where an advertisement was photographed, but where no subsequent transaction related to the advertised movie tickets was made. If the consumer chooses to engage in a further transaction related to the object (e.g., purchase the movie tickets, etc.), then the movie can be given an ever higher priority based and assigned an even level of interest.

As shown above, it is contemplated that based on the information recognized, stored or prioritized by the system, the system could provide a recommendation, coupon, or other information related to real world objects that have not yet been scanned or captured by the consumer. In some embodiments of the inventive subject matter, the scoring, ranking or prioritization of actions, objects or other information can be done in a manner where users are grouped based on a demographic, and an action of a user within that group can affect the scoring, ranking of prioritization associated with the some members of, or even the entire demographic.

As yet another example, where a class of goods or services, or a specific brand or type of goods or services is purchased by the consumer with increased frequency, those classes, brands or types of goods or services can be assigned a higher priority than those where fewer transactions occurred. Moreover, the system can identify one or more common attributes of objects that were scanned, captured, or purchased by a user and provide recommendations, coupons or information based on those attributes. Identifying the common attributes can allow the system to identify the interests and intent profile of the consumer.

It is also contemplated that the system provider can charge a fee to providers whose goods or services are mentioned in a recommendation, coupon, or other information provided to the consumer.

Once the system has identified, stored or prioritized the objects or attributes of interest to the consumer in a database associated with the system, it is contemplated that a transaction can occur automatically based on real time or substantially real time automatic ambient collection of sensor data forming a digital representation of the real-world object without requiring the end user to initiate the transaction. For example, when the user passes by Dodgers™ stadium, a mobile device carried by the user can automatically open the team's official website in an Internet browser based on stored data indicating an interest in baseball team websites.

In some contemplated embodiments, a system can be configured to identify a consumer based on location data or height data (e.g., a height of the user, location of a device relative to the ground, location of a device by street, city or state, etc.) obtained via a consumer device, objects scanned, objects with which the consumer interacts or transacts in relation to, or any combination thereof. For example, a consumer carrying a consumer mobile device may open an SDK generated application at any time. Regardless of whether the consumer enters a consumer ID, the device can begin scanning the objects within its field of view and allow the consumer to interact or transact in relation to the objects scanned. If the consumer has logged in, the consumer can be authenticated based on at least one of the location data, height data, scans, interactions or transactions. If the consumer has not logged in, the consumer can be identified based on at least one of the location data, height data, scans, interactions or transactions, thereby eliminating the need to log in manually.

Figure 4B:
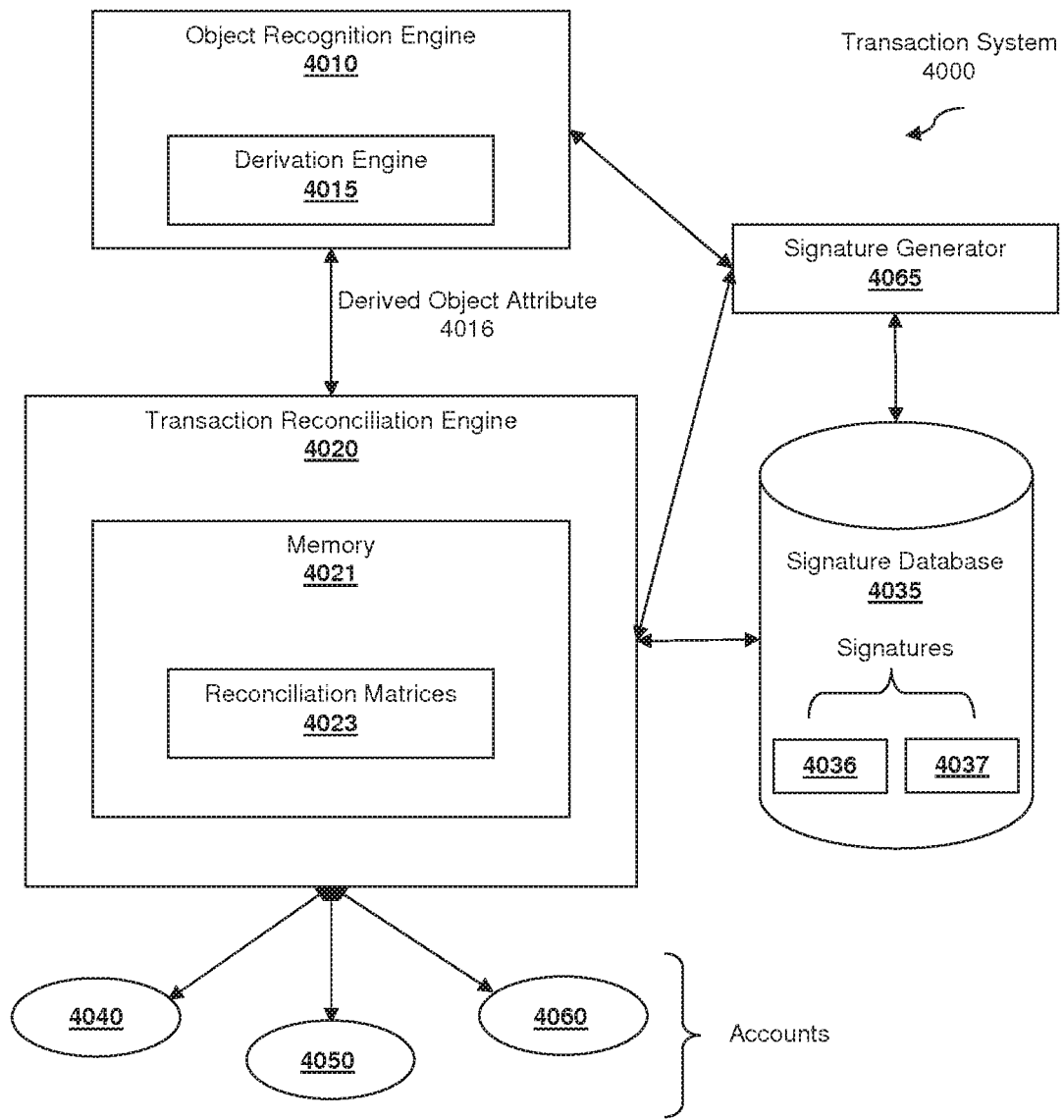
FIG. 4B shows an embodiment of a transaction system of the inventive subject matter.

FIG. 4B presents another possible embodiment of a transaction system of the inventive subject matter. Transaction system 4000 comprises an object recognition engine 4010, which is configured to recognize a real-world object and derive one or more object attributes of the object via derivation engine 4015.

As previously discussed, it is contemplated that the inventive subject matter described herein can leverage one or more techniques disclosed, possibly including object recognition techniques, in the following co-owned applications: U.S. provisional application No. 60/246,295 filed Nov. 6, 2000; U.S. provisional application No. 60/317,521 filed Sep. 5, 2001; U.S. application Ser. No. 11/510,009 titled "Interactivity Via Mobile Image Recognition" filed on Aug. 25, 2006; U.S. application Ser. No. 12/505,726 titled "Interactivity with a Mixed Reality" filed on Jul. 20, 2009; U.S. application Ser. No. 13/005,716 titled "Data Capture and Identification System and Process" filed on Jan. 13, 2011; U.S. application Ser. No. 13/037,317 titled "Image Capture and Identification System and Process" filed on Feb. 28, 2011; and U.S. application Ser. No. 13/037,330 titled "Object Information Derived from Object Images" filed on Feb. 28, 2011. For example, the inventive subject matter can utilize one or more of the techniques for presenting information such as Internet content to a user described in U.S. application Ser. No. 13/005,726.

The object recognition engine can transmit one or more of the derived object attributes 4016 to transaction reconciliation engine 4020. Transaction reconciliation engine 4020 comprises a memory 4021 storing one or more reconciliation matrices 4023. Transaction reconciliation engine 4020 is configured to perform many actions including, among other things, associating an object attribute with a recognition signature (e.g., 4036, 4037, etc.), mapping the recognition signature to one or more accounts via the reconciliation matrix, and reconciling a transaction among the accounts. One should appreciate that the disclosed approach seeks to map the derived object attributes to reconciliation accounts without requiring an intermediary look-up of the recognized object. In fact, the disclosed approach lacks any requirement to recognize an object at all.

In order to associate object attribute(s) with a recognition signature, the transaction reconciliation engine 4020 can compare the attribute(s) with recognition signatures 4036 and 4037, which can be stored in signature database 4035. It is contemplated that an association between an object attribute or attributes and a recognition signature (e.g., 4036, 4037, etc.) can occur when certain parameters are met (e.g., a threshold match score, a complete match, a partial match, etc.). One should appreciate that recognition signatures 4036 and 4037 can be defined within the same attribute namespace or valuespace as used to derive object attributes. For example, the attributes space could include SIFT features; audio amplitudes, frequencies, envelopes, or phases; position; orientation; location; context; or other attributes.

Recognition signatures can comprise a collection of values associated with certain attributes, and can be generated in a number of ways. All commercially suitable digital signature schemes are contemplated. A suitable technique that could be adapted for use with the inventive subject matter includes those disclosed by U.S. Pat. No. 7,650,616 to Lee.

A signature can be represented in a number of ways including, for example, as an N-tuple, scalar, vector or matrix having n-dimensions of relevance (where n can equal 0, 1, 2, 3, 5, 10 dimensions in a recognition space, etc.). It is contemplated that a key value (e.g., hash value, etc.) can be generated from the values associated with each attribute of a signature. These key values can be used to query a hash table or other reconciliation matrix to map a recognition signature to one or more accounts.

One technique for generating a recognition signature can comprise a manual input into recognition signature generator 4065.

For example, a system manager or other user can generate a recognition signature to be mapped to both a Costco account and a user's Costco™ American Express™ card by including values representative of specific attributes. The attributes represented can comprise any suitable attributes, including for example, a word, a price, a location, a time, a logo, an account number, biometrics, an image, or audio. For this particular example, a recognition signature can be generated in the form of a vector having four values, wherein the first value is representative of an account holder's identity (e.g., driver's license photo, name, age, birthday, identification number, etc.), the second value is representative of an item to be purchased (e.g., barcode, QR code, image of product, etc.), the third value is representative of a Costco™ location, and the fourth value is representative of an authorization (e.g., a motion, fingerprint scan, signature, voice authorization, etc.).

Contemplated attributes can comprise audio data (e.g., tone, pitch, bass, rhythm, melody, etc.), textual data (e.g., words, names, handwriting, etc.), imagery data (e.g., pixilation, SIFT features, symbols, etc.), video data, a gesture, a brightness, a location, or any other suitable type of data.

Another technique for generating a recognition signature can be via recognition of historical data related to one or more users. In some embodiments, the recognized data related to a user can be used to represent a demographic. For example, a recognition signature generator 4065 can be communicatively coupled to a user device and configured to acquire transaction data related to the user or device. Where a user initiates a transaction via the user device, the recognition signature generator can be configured to acquire data related to the transaction and generate a signature. It is also contemplated that a single generated signature can be based on multiple transactions initiated via the user device.

For example, a recognition signature generator 4065 can acquire data indicating that a user device was inside of a Target™ when a user made a purchase utilizing her Target™ reward card, a Visa™ credit card for 50% of the purchase, and an American Express™ card for 50% of the purchase. Based on this data, the recognition signature generator 4065 can generate a signature related to Target™, the reward program, Visa™, and American Express™. When this signature is used to query a reconciliation matrix, alone or along with one or more other signatures, the signatures can then be mapped to a purchasable item, a user's Target™ reward card, the user's Visa™ card, and the user's American Express™ card. Thus, one should appreciate that recognition signatures 4036 and 4037 can be a priori created, possibly by the user or a third party, or could be dynamically created through observation of the user.

It is contemplated that the specificity of a recognition signature can vary depending on the amount of historical data available. Where there is not a sufficient amount of historical data available, a user or an account manager may be prompted to confirm or deny certain associations (e.g., between attribute and signature, between signature and account, etc.) prior to completion of a reconciled transaction.

A signature can be mapped to one or more accounts (e.g., 4040, 4050, 4060, etc.) via a query of a reconciliation matrix 4023. The reconciliation matrix or matrices 4023 can be utilized to map one or more of the recognition signatures to one or more accounts.

As discussed above, a reconciliation matrix can comprise an algorithm, a lookup table, or any other suitable rules set or data structure that can be utilized in mapping a recognition signature to one or more accounts.

One example of such a matrix can comprise a hash function, which can map a recognition signature to an account. It is contemplated that the recognition signature can be represented by a vector of attribute values and accounts can be represented by a vector of account numbers. The reconciliation matrix can accept the vector of attribute values as input and return the vector of account numbers as output. The mapping within the matrix operates as a function of a look up table, a mathematical matrix operation, or other mapping algorithm. Further, the vector of account numbers could include weighting factors indicating what fraction of a transaction amount should be applied to each member account in the vector, Even further, the reconciliation matrix can include rules for resolving placement fractional amount of currency e.g., a fraction of a cent) among accounts.

Once a signature is mapped to one or more accounts utilizing a reconciliation matrix 4023, the transaction reconciliation engine can reconcile the transaction amongst the accounts in a suitable manner, such as by (1) associating rewards points with the user's reward card, (2) transferring 50% of the item's purchase price from the user's Visa™ card to a Target account, and (3) transferring 50% of the item's purchase price from the user's American Express™ card to a Target account.

Figure 4C:
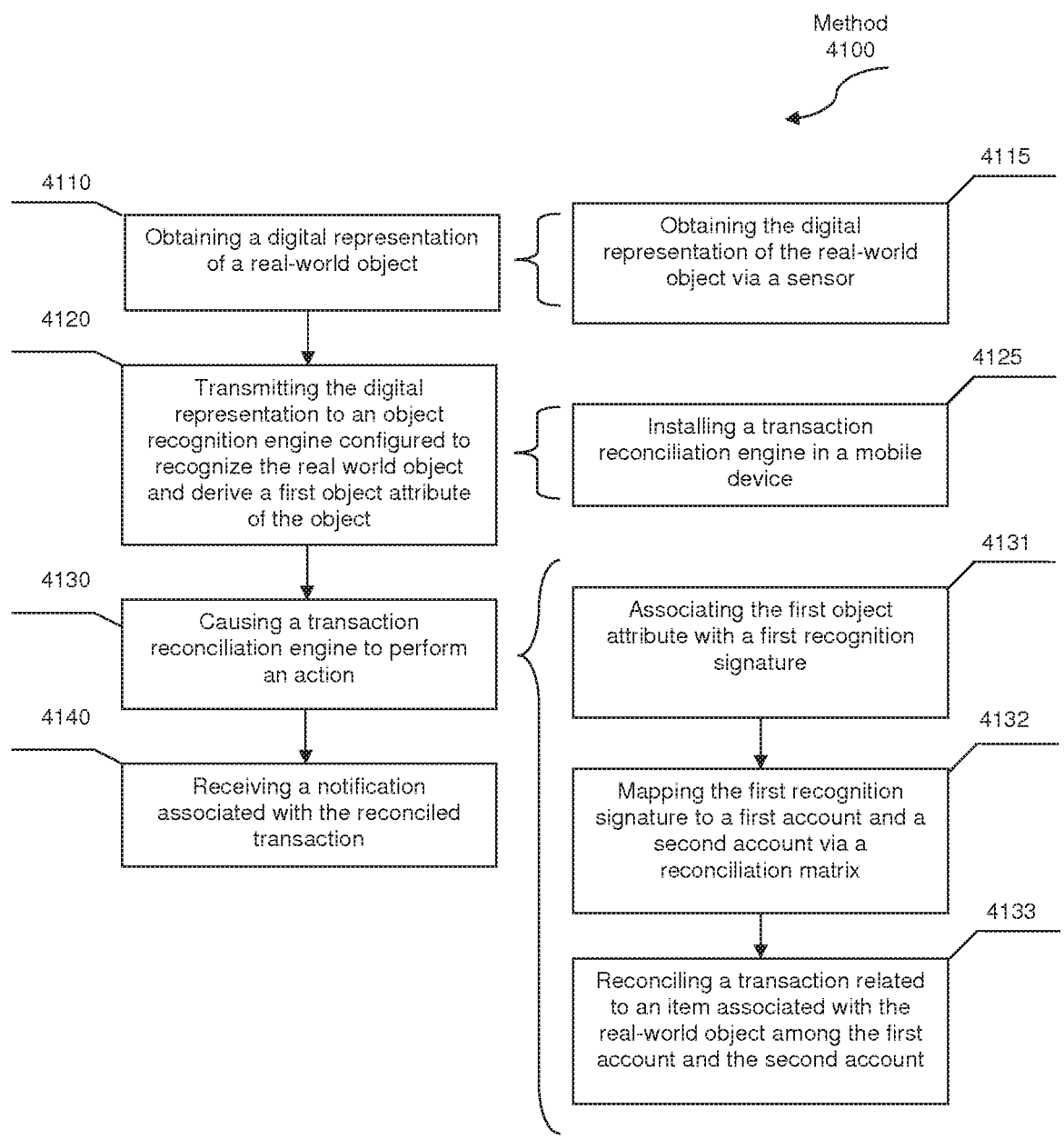
FIG. 4C is a flowchart showing a method of causing a transaction reconciliation via a mobile device.

FIG. 4C presents a method 4100 of causing a transaction to be reconciled via a mobile device. A digital representation of a real-world object can be obtained by a mobile device as shown in step 4110. It is contemplated that the digital representation can be obtained via a sensor of the mobile device as suggested by step 4115, or a sensor of an external device communicatively coupled to the object recognition engine or transaction reconciliation engine.

Once obtained by the mobile device, the mobile device can transmit the digital representation to an object recognition engine that is configured to recognize the real world object and derive one or more object attributes of the object as shown in step 4120. As previously discussed, it is contemplated that the step of recognizing the real world object and deriving one or more object attributes of the object can leverage one or more techniques disclosed in the following co-owned applications: U.S. provisional application No. 60/246,295 filed Nov. 6, 2000; U.S. provisional application No. 60/317,521 filed Sep. 5, 2001; U.S. application Ser. No. 11/510,009 titled "Interactivity Via Mobile Image Recognition" filed on Aug. 25, 2006; U.S. application Ser. No. 12/505,726 titled "Interactivity with a Mixed Reality" filed on Jul. 20, 2009; U.S. application Ser. No. 13/005, 716 titled "Data Capture and Identification System and Process" filed on Jan. 13, 2011; U.S. application Ser. No. 13/037,317 titled "Image Capture and Identification System and Process" filed on Feb. 28, 2011; and U.S. application Ser. No. 13/037,330 titled "Object Information Derived from Object Images" filed on Feb. 28, 2011. For example, the inventive subject matter can utilize one or more of the techniques for presenting information such as Internet content to a user described in U.S. application Ser. No. 13/005, 726.

The mobile device can then cause a transaction reconciliation engine to perform one or more actions as shown in steps 4130 through 4133. For example, the transaction reconciliation engine can be caused to associate an object attribute with a recognition signature as shown in step 4131, map the signature to one or more accounts via a reconciliation matrix as shown in step 4132, or reconcile a transaction related to an item associated with a real-world object among two or more accounts as shown in step 4133.

The transaction reconciliation engine can be installed on the mobile device itself, or can compose a separate device communicatively coupled to the mobile device. Among the actions that can be performed by the transaction reconciliation engine include, for example, associating an object attribute with a recognition signature, mapping a recognition signature to one or more accounts via, a reconciliation matrix stored therein, or reconciling a transaction related to an item associated with the real-world object among a plurality of accounts.

Upon completion of a reconciled transaction, a notification associated with the reconciled transaction can be received by the mobile device as suggested by step 4140. It is contemplated that this notification can be received by the mobile device in any suitable format and manner, including for example, a push notification or an email.

Example Recognition Signature Use Cases

The following use cases provide various examples of some aspects of some embodiments of the inventive subject matter.

Magazine Subscription Use Case

A user and a magazine publisher engaging in a transaction can utilize a system of the inventive subject matter to purchase/sell a magazine subscription, and divide one or more payments from the user amongst various payees.

The user can capture a digital representation of an HGTV™ magazine via a camera enabled mobile device. The digital representation can be sent to an object recognition engine that is configured to recognize the magazine and derive attributes of the magazine. For example, the object recognition engine can derive the following attributes of the magazine: the publication date, the name of the magazine, the publisher name, data related to the cover photo (e.g., SIFT features, grayscale value, RGB value, identification of a celebrity in the image, brand name of clothing worn by celebrity, etc.), headlines, price, promotions, coupons, publication period (e.g., weekly, biweekly, monthly, etc.), or any other suitable attributes. For purposes of this example, the derived attributes can comprise (1) a Jan. 7, 2013 publication date, (2) Jessica Alba as the cover image, (3) a weekly publication period, (4) a promotional price of $1 per issue for 52 weeks, and (5) Visa™ and MasterCard™ as the accepted payment methods (collectively referred to as "Object Attributes").

The derived object attributes can then be transmitted to a transaction reconciliation engine communicatively coupled with the object recognition engine. The transaction reconciliation engine can comprise a memory storing one or more reconciliation matrices, which can be utilized to map a recognition signature to one or more accounts.

The transaction reconciliation engine can be configured to associate an attribute or attributes (derived by the object recognition engine) with a recognition signature based on a partial match, best match, or complete match. One possible recognition signature ("Object Signature") can comprise a price value of $1 per issue, and a publication period value of weekly, and an accepted payment method value of American Express™ or debit card. If an association is set to occur based on a partial match or a best match, it is possible that the attributes of the magazine will be associated with this recognition signature. However, if a complete match is required, the attributes of the magazine will not be associated with this recognition signature.

It can generally be preferred that a complete match be required for transactions where only one or a few recognition signature association is required, but that a partial or best match can be required for transactions where more recognition signature associations are required. As used herein, the term "best match" is used broadly to include, for example, where an attribute or set of attributes derived is compared to a plurality of recognition signatures of a database, and the most commonality (requirements or optional conditions met) is found with one of a few of the recognition signatures.

If an association is made between the Object Attributes and the Object Signature, the Object Signature, either alone or in combination with other recognition signatures, can be used to query a reconciliation matrix. The process of querying a reconciliation matrix will be discussed in further detail below.

One other possible recognition signature association that can be required is an association between user or user device attributes and a recognition signature. For example, attributes associated with a user or user device can be received by the transaction reconciliation engine via the user device. These attributes can include, among other things, credit card account numbers used to make purchases via the device, names associated with the account numbers, types of items purchased using an account number, information related to a user of the device at or near the time a transaction is initiated (e.g., fingerprint data, voice recognition, username, password, address, gesture, height, weight, etc.), or types of items purchased by the user. The foregoing user or user device attributes can be associated with a recognition signature ("User or User Device Signature") based on a partial, best or complete match. For purposes of this example, the user attribute can be associated with a recognition signature related to user X ("User or User Device Attributes").

If an association is made between the User or User Device Attributes and the User or User Device Signature, the User or User Device Signature can be used to query a reconciliation matrix, either alone or in conjunction with other recognition signatures.

Yet another possible recognition signature association that can be required is an association between a payment division requirement and a recognition signature ("Payment Division Signature"). The attributes related to a payment division requirement can be obtained via the real-world object itself, a payee entity associated with an item related to the real-world object, a third party, or any other suitable source. For example, it is contemplated that the attributes can be obtained via Hearst™ Corporation, a payee who would obtain a portion of a payment related to a subscription of HGTV™ magazine. For purposes of this example, the payment division requirements can require that 50% of a subscription fee be paid to Hearst™ Corporation, while 50% of the subscription fee be paid to the newsstand carrying the magazine photographed ("Payment Division Requirement Attributes"). If an association is made between the Payment Division Requirement. Attributes and the Payment Division Signature, the Payment Division Signature can be used to query a reconciliation matrix, either alone or in conjunction with other recognition signatures.

Mapping Recognition Signature To Account

Assuming an association is made between the various attributes described above and the Object Signature, User or User Device Signature, and Payment. Division Signature, it is contemplated that one, some, or all of the recognition signatures can be used to query a reconciliation matrix.

The reconciliation matrix can be utilized to map one or more, of the recognition signatures to one or more accounts. In this example, the combination of Object Signature, User or User Device Signature, and Payment Division Signature can be mapped to (1) User X's Visa debit card, (2) a Hearst™ Corporation account, and (3) a newsstand's account.

The transaction reconciliation engine can be configured to reconcile User X's subscription to HGTV™ magazine by transferring $0.50 from User X's Visa™ debit card to each of the Hearst™ Corporation account and the newsstand's account on a weekly basis until the subscription is cancelled.

The transaction reconciliation engine can reconcile some or all of the accounts in real-time or over a period of time, and can be configured to handle certain problems that may arise (e.g., an error in accounting, a lack of funds, etc.). For example, where a payor's account has insufficient funds, a back-up payor account can be utilized in making a payment.

It is contemplated that User X can receive a notification of each transfer via her mobile device in any commercially suitable manner.

Additional Use Cases

The below use cases provide various examples of some aspects of some embodiments of the inventive subject matter.

Downloading Digital Files

A user and digital music provider can utilize a transaction system of the inventive subject matter to (1) download/permit download of a digital file, and (2) reconcile a transaction between a payor account and one or more payee accounts.

For example, Alison, while listening to "Scream and Shout" by Britney Spears and Will.i.am, can cause her cell phone to receive audio data related to the song (e.g., via a mobile application such as Shazam™, etc.). This data is sent to an object recognition engine that derives various attributes of the audio data including, for example, lyrics, tone, pitch, bass, types of instruments, speed, sound patterns, or any other suitable attributes of audio data.

Once the object recognition engine derives one or more object attributes, a transaction reconciliation engine coupled with the object recognition engine can associate one or more of the object attributes with a recognition signature. For example, a lyric and a sound pattern can be associated with signature having values representative of the lyric and the sound pattern. The transaction reconciliation engine can then map the signature to (1) a payee account for Britney Spears for a royalty payment, (2) a payee account for Will.i.am for a royalty payment, (3) a song writer account for royalty payment, (4) a record label payee account, and (5) an iTunes™ payee account. Alison can input her credit card payment information, and the transaction reconciliation engine can reconcile the transaction by placing a percentage of the payment from Alison's account to each of the payee accounts in accordance with a set of rules.

Cable Subscription

As another example it is contemplated that a user can capture video data via her cellular phone related to a television commercial for the HBO™ show Game of Thrones™. The cellular phone can transmit the video data to an object recognition engine that recognizes the video data as being related to Game of Thrones™ and derives attributes of the video data.

The object recognition engine can be coupled with a transaction reconciliation engine having a memory storing reconciliation matrices. The transaction reconciliation engine can associate the attributes with a recognition signature, map the signature to an HBO account, the user's credit card account, the SAG, DGA or other guild accounts associated with talent in Game of Thrones™, and reconcile a subscription to HBO™ between the relevant accounts.

Payment For Public Transportation

In yet another example, it is contemplated that a user wishing to ride a bus, taxi, plane or other public transportation vehicle can purchase a ticket or entrance by capturing an image of the vehicle or advertisement associated with the vehicle. A system of the inventive subject matter can then be used to distribute payment amongst the transportation company, taxes to the city, tips to drivers and other employees, beverage and food vendors, and any other parties associated with the transaction.

Patient Care

In yet another example, a user can capture an image of a patient and possibly CPT codes or other information, and use image data to reconcile a payment for a medical procedure amongst, among other things, healthcare providers, a patient account for co-payment, payment from an insurance company, and a hospital.

Pre-Order

In yet another example, a user can pre-order or pre-purchase a video game or other product by capturing digital data related to the game (e.g., an image of a game advertisement, audio data related to a game advertisement, etc.). It is contemplated that a payment can be temporally reconciled wherein a down-payment or a deposit can be reconciled immediately between a video game vendor, a user checking account, and Electronic Arts™ (EA™) (the game developer), and that the final full payment can be further reconciled at a later time (e.g., upon pick-up or delivery, etc.).

Charitable Donations

It is also contemplated that a system of the inventive subject matter could be used to reconcile a payment amongst a for-profit organization and a non-profit organization. Oftentimes an establishment, such as Starbucks™ will promote that a percentage of a purchase of a pound of coffee or other good will be donated to a charitable organization. Using a system of the inventive subject matter, a user can capture an image of the product, QR code, barcode or other item associated with the pound of coffee, and the purchase can be reconciled amongst, inter alia, Starbucks™ and the American Kidney Fund™.

It is further contemplated that the system can be configured to keep track of payments made from one or more user accounts to a charitable organization for tax purposes. It is also contemplated that the system can generate a partial or complete report, such as a Form 1040, Schedule A.

Rewards Programs in yet another example, a system of the inventive subject matter can be used to reconcile a transaction with a rewards program account (e.g., a frequent flyer miles program, restaurant rewards program, etc.). For example, it is contemplated that a user's Visa™ card can be associated with an American Airlines™ frequent flyer miles program. Whenever the user utilizes the transaction system to make a purchase or other transaction, it is contemplated that the transaction can be reconciled between the user's Visa™ card (debit), the American Airlines™ frequent flyer miles program (points credit), and the vendor(s)' accounts (monetary credit). It is contemplated that when the system is used to purchase an airline ticket on American Airlines™, additional points can be credited to the American Airlines™ frequent flyer miles program.

Gamification in yet another example, a system of the inventive subject matter can be used for gamification. When a user plays a video game in conjunction with the transaction system, the user can be awarded points, achievement badges, virtual currency, etc., based on derived attributes and a reconciliation matrix. For example, the object recognition engine can recognize that a level was completed on a video game. The object recognition engine can derive object attributes associated with the completed level, and a transaction reconciliation engine can associate the attribute(s) with a recognition signature, map the signature to one or more accounts via a reconciliation matrix, and reconcile a transaction (e.g., award a badge, etc.) amongst the user's gaming account and the game's leader board.

Tolls

Yet another use case can include using a recognition engine to recognize vehicles on a toll road. The recognition engine use object attributes associated with a vehicle (e.g., make, model, color, location, time, license plate, etc.) for several purposes. First, the object attributes in general can be used to identify or verify that the vehicle is properly authorized to utilize the toll road. For example, the engine, or transaction system, can compare the make and model of the vehicle against DMV records associated with the license plate to ensure the vehicle or plates are not stolen. Second, the object attributes can be used to determine which accounts could be charged for use of the toll road. Consider a scenario where the salesman utilizes his personal vehicle. The salesman could have multiple accounts that should be charged in exchange for using the toll road. During working hours (e.g., based on a GPS location or time of day), a corporate account might be charged. During weekends, a personal account might be charged. Further, possibly based on an employee agreement, both accounts might be charged (e.g., 75% corporate and 25% personal during working hours).

Rights Management

In view that the disclosed system is capable of reconciling multiple accounts and can be leveraged with respect to purchasing or otherwise interacting with digital media, the disclosed system can be used to provide payment to rights holders associated with digital media. Consider a scenario where individual seeks to obtain content associated with a movie poster, or possibly a poster of sports team (e.g., the LA Lakers®). The person can capture an image of the poster and the system can return a selection of multimedia content bound or linked to the poster. Should the person decided to purchase the content, the transaction system can select one or more reconciliation matrices based on derived attributes from image of the poster, or even based on user selection. The reconciliation matrices can then be used to identify accounts for all rights holders associated with the content: actors, producers, owners, distributers, publishers, artists, or other individuals associated with the content. When the transaction takes place, each account can be credited according to one or more business rules determined form the reconciliation matrix.

Additional Concepts

One should also note that the inventive subject matter is also considered to include the additional concepts presented below.

Methods of Reconciling a Payment of a Coupon

Figure 5:
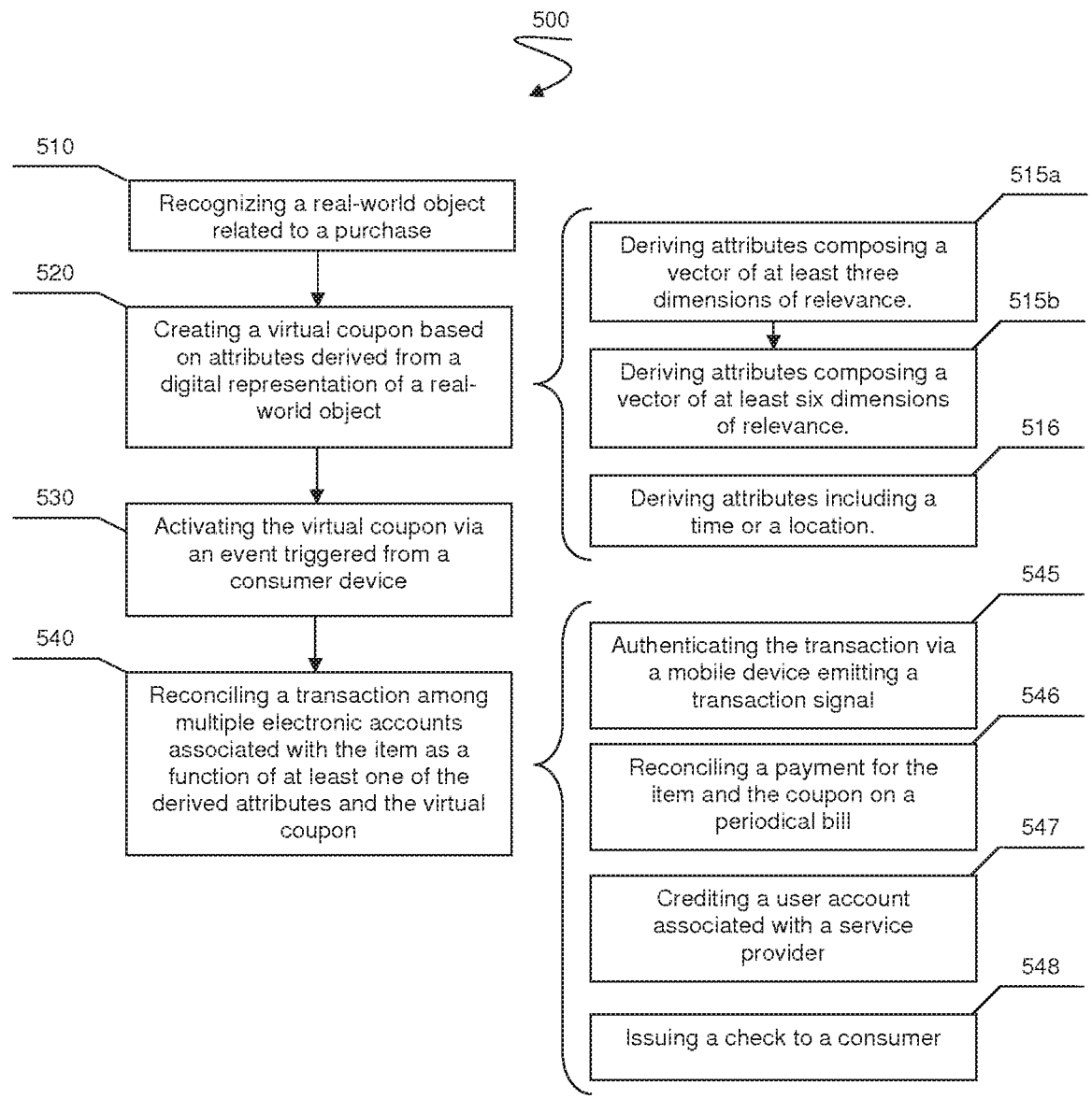
FIG. 5 is a flowchart showing a method of reconciling a payment of a coupon.

Some aspects of the inventive subject matter can include a method of reconciling a payment of a coupon, as shown in FIG. 5. Such methods can comprise recognizing a real world object related to a purchasable item via a recognition engine. In some embodiments a virtual coupon can be created based on attributes derived from a digital representation of the real world object recognized via a recognition engine. The virtual coupon can then be activated via an event that is triggered from a mobile device. Moreover, a transaction amongst multiple electronic accounts associated with the object can be reconciled as a function of the derived attributes and the virtual coupon.

TABLE 1

Proposed Method of Reconciling a Payment of a Coupon Claims

| Number | Claim |
|---|---|
| 1 | A method of reconciling payment of a coupon, the method comprising: recognizing, by a recognition engine, a real-world object related to a purchasable item (as suggested by step 510); creating a virtual coupon based on attributes derived from a digital representation of the real-world object (as suggested by step 520); activating the virtual coupon via a event triggered from a consumer mobile device (as suggested by step 530); and reconciling a transaction among multiple electronic accounts associated with the real world object as a function of the derived attributes and the virtual coupon by accounts (as suggested by step 540). |
| 2 | The method of claim 1, wherein the attributes include a time (as suggested by step 516). |
| 3 | The method of claim 1, wherein the attributes include a location (as suggested by step 516). |
| 4 | The method of claim 1, wherein the attributes compose a vector of at least three dimensions of relevance (as suggested by step 515). |
| 5 | The method of claim 4, wherein the attributes compose a vector of at least six dimensions of relevance (as suggested by step 515). |
| 6 | The method of claim 5, wherein the vector comprises the following dimensions: a time, a place, and three dimensions of the real-world object. |
| 7 | The method of claim 5, wherein the vector is unique to the transaction. |
| 8 | The method of claim 1 wherein the event occurs automatically based on ambient data. |
| 9 | The method of claim 1, wherein the event includes a user generated event on the mobile device. |
| 10 | The method of claim 1, wherein the step of reconciling the transaction includes authenticating the transaction via the mobile device, wherein the mobile device is emitting a transaction signal (as suggested by step 545). |
| 11 | The method of claim 10, wherein the transaction signal is unique to the transaction. |
| 12 | The method of claim 10, wherein the transaction signal comprises a visual display. |
| 13 | The method of claim 10, wherein the transaction signal comprises a non-visual signal. |
| 14 | The method of claim 13, wherein the transaction signal at least one of the following: an RF signal, an audible sound, an ultrasound, a dynamic RFID value, and a light-based signal outside the visual spectrum. |
| 15 | The method of claim 10, wherein the step of reconciling the transaction includes reconciling payment for the item and the coupon on a periodical bill (as suggested by step 546). |
| 16 | The method of claim 15, wherein the periodical bill is associated with at least one of the following: a user, a coupon provider, a vendor, a cell phone carrier, a subscription, a bank, and a third-party exchange. |
| 17 | The method of claim 15, wherein the periodical bill comprises a periodicity of on of the following: weekly, bi-weekly, monthly, quarterly, semi-annually, and annually. |
| 18 | The method of claim 1, wherein the step of reconciling the transaction includes crediting a user account associated with a service provider (as suggested by step 547). |
| 19 | The method of claim 1, wherein the step of reconciling the transaction includes issuing a check to a consumer (as suggested by step 548). |
| 20 | A method of redeeming a coupon, the method comprising: obtaining, via a camera enabled device, a digital representation of a real-world object related to a purchasable item; transmitting the digital representation to a reconciliation engine; obtaining a virtual coupon generated based on attributes of the digital representation; and triggering an activation of the virtual coupon via the mobile device. |

Transaction Apparatus

Figure 6:
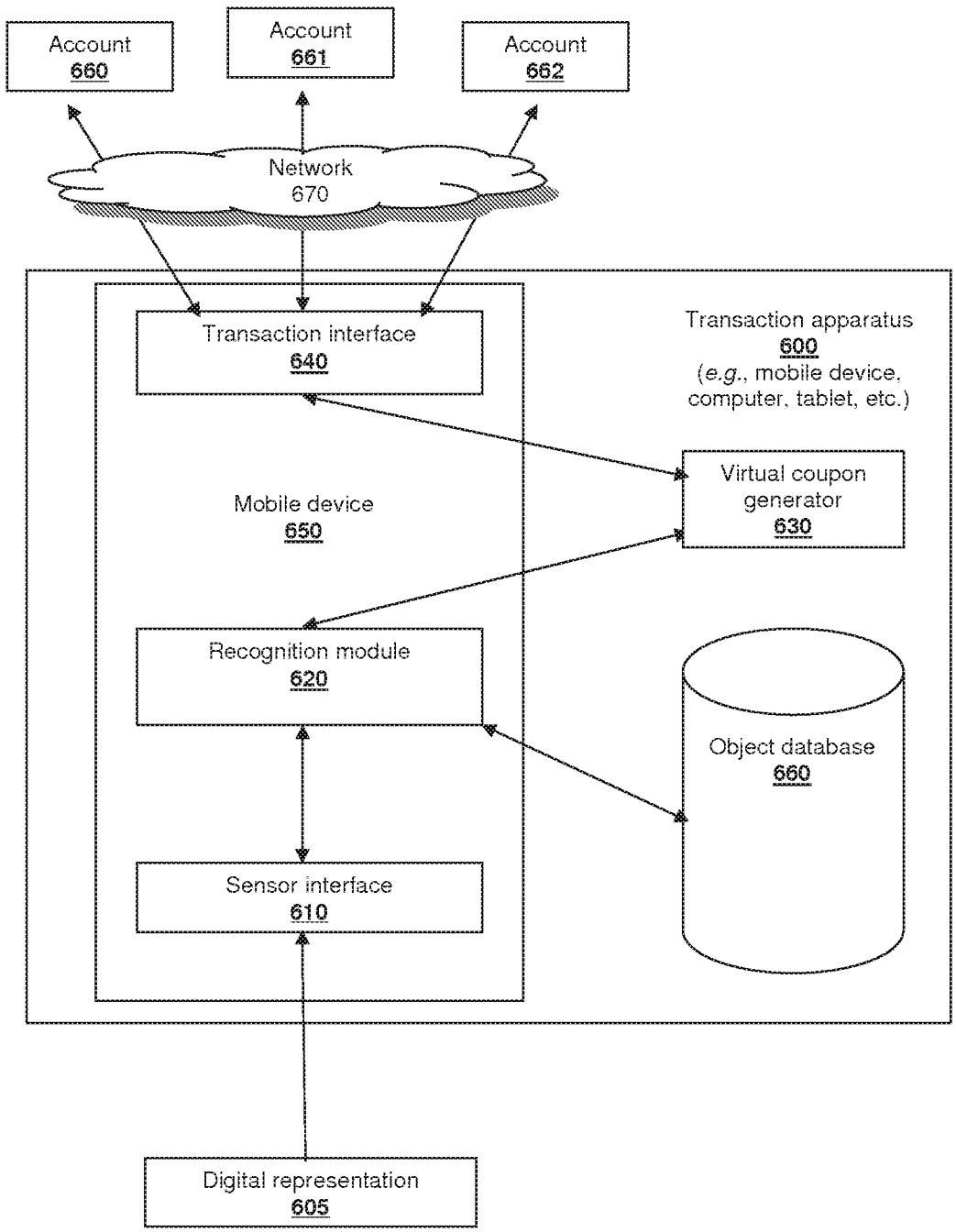
FIG. 6 shows a transaction apparatus of the inventive subject matter.

In some embodiments of the inventive subject matter, a transaction apparatus is provided, as shown in FIG. 6. The transaction apparatus can comprise a sensor interface, recognition module, and a virtual coupon generator, among other things. The sensor interface can be configured to acquire a digital representation of a real world object. The recognition module can be coupled with the sensor interface and configured to derive object attributes from the digital representation. The recognition module can then identify a purchasable item as a function of the object attributes. The virtual coupon generator can be coupled with the recognition module and configured to generate a virtual coupon associated with the purchasable item as a function of the object attributes. The transaction apparatus can further comprise a transaction interface that is configured to reconcile an account based on a payment for the purchasable item and use of the virtual coupon.

TABLE 2

Proposed Transaction Apparatus Claims

| Number | Claim |
|---|---|
| 1 | A transaction apparatus 600 comprising: a sensor interface 610 configured to acquire a digital representation of a real-world object; a recognition module 620 coupled with the sensor interface and configured to derive object attributes from the digital representation and to identify a purchasable item as a function of the object attributes; a virtual coupon generator 630 coupled with the recognition module and configured to generate a virtual coupon associated with the purchasable item as a function of the object attributes; and a transaction interface 640 configured to reconcile an account (e.g., 660, 661, or 662 ) based on a payment for the purchasable item and use of the virtual coupon. |
| 2 | The apparatus of claim 1, wherein the digital representation comprises a digital representation 605 of a scene. |

TABLE 2-continued

Proposed Transaction Apparatus Claims

| Number | Claim |
|---|---|
| 3 | The apparatus of claim 2, wherein the recognition module is further configured to map the object attributes to an a priori known context. |
| 4 | The apparatus of claim 3, wherein the virtual coupon generator is further configured to generate the coupon as a function of the context. |
| 5 | The apparatus of claim 1, wherein the digital representation comprises a representation of non-visible properties of the real-world object. |
| 6 | The apparatus of claim 5, wherein the non-visible properties of the real-world object comprises at least one of the following: a sound, a texture, a taste, a smell, light out side the visible spectrum, a radio signal, a heat signal, an emotional state, and a non-visible bio-metric. |
| 7 | The apparatus of claim 1, wherein the digital representation comprises a representation of visible properties of the real-world object. |
| 8 | The apparatus of claim 7, wherein the visible properties of the real-world object comprises at least one of the following: a printed text, a printed image, an electronically displayed image, a reflection, a rendering, a three dimensional model or image, a time varying appearance, a projection, and an light signal from the object. |
| 9 | The apparatus of claim 1, wherein the virtual coupon comprises a promotion. |
| 10 | The apparatus of claim 9, wherein the promotion comprises at least one of the following: an advertisement, a sale, and a subsidy. |
| 11 | The apparatus of claim 1, wherein the virtual coupon is unique to a user of the transaction apparatus. |
| 12 | The apparatus of claim 1, further comprising a mobile device 650 comprising the sensor interface, the recognition module, and the transaction interface. |
| 13 | The apparatus of claim 12, wherein the mobile device comprises at least one of the following: a mobile phone, a computer, a vehicle, a mobile kiosk, and a spacecraft. |
| 14 | The apparatus of claim 1, wherein the object attributes include features derived according to at least one of the following: vSLAM, VIPR, GPS, or SIFT. |
| 15 | The apparatus of claim 1, wherein the object attributes include a location and a time. |
| 16 | The apparatus of claim 1, wherein the real-world object comprises a printed object. |
| 17 | The apparatus of claim 1, wherein the real-world object comprises a non-printed object. |
| 18 | The apparatus of claim 1, wherein the purchasable item comprises at least one of the following: a good, a product, and a service. |
| 19 | The apparatus of claim 1, further comprising an object database 660 storing target objects and coupled with the recognition module, the target objects having target object attributes. |
| 20 | The apparatus of claim 19, wherein the recognition module is further configured to identify the purchasable item by obtaining a target object from the target object database by comparing the object attributes to the target object attributes. |
| 21 | The apparatus of claim 19, wherein the recognition module is further configured to obtain at least a portion of the object database from a remote source over a communication connection as a function of the object attributes. |
| 22 | The apparatus of claim 21, wherein the recognition module is configured to obtain the at least a portion of the object database based on location and time attributes. |
| 23 | The apparatus of claim 22, wherein the location and time attributes are associated with the transaction device. |
| 24 | The apparatus of claim 1, wherein the transaction device comprises at least one of the following: a cell phone, a kiosk, a point-of-sales device, and an on-line account server. |
| 25 | The apparatus of claim 1, wherein the account comprises at least one of the following: a user account, a cell carrier account, a coupon provider account, a vendor, and a service provider account. |
| 26 | The apparatus of claim 1, wherein the account comprises an inventory of transactions associated with a user of the transaction apparatus. |
| 27 | A mobile device comprising: a sensor interface configured to acquire a digital representation of a real-world object; a recognition module coupled with the sensor interface and configured to derive object attributes from the digital representation, including a location and time, and to identify a purchasable item as a function of the object attributes, including the location and time; a virtual coupon generator coupled with the recognition module and configured to generate a virtual coupon associated with the purchasable item as a function of the object attributes; and a transaction interface configured to reconcile at least one account based on a payment for the purchasable item and use of the virtual coupon, where a user account is credited in response to payment from the purchasable item and use of the virtual coupon. |
| 28 | A method of using a virtual coupon via a transaction apparatus, comprising: acquiring, via a sensor interface of the apparatus, a digital representation of a real world object; obtaining a virtual coupon associated with a purchasable item and generated by a virtual coupon generator as a function of object attributes derived by a recognition module; and utilizing the virtual coupon and initiating a payment for the purchasable item. |

Method of Mitigating Risk of Transaction Fraud

Some aspects of the inventive subject matter can include a method of mitigating risk of transaction fraud, as shown in FIG. 7. Such methods can comprise providing a virtual coupon associated with a purchasable item on a mobile device. The mobile device can then engage in an electronic transaction related to the purchasable item and the virtual coupon. A user can select a target account from a plurality of available user accounts (e.g., via the mobile device, etc.). The electronic transaction can be authenticated as a function of transaction attributes derived by the mobile device and the user selected target account(s). Moreover, the target account can be credited (e.g., with rewards points, discounts, coupons, a reduction in balance, etc.) according to terms of the virtual coupon.

TABLE 3

Proposed Method of Mitigating Risk of Transaction Fraud Claims

| Number | Claim |
|---|---|
| 1 | A method of mitigating risk of transaction fraud, comprising: providing a virtual coupon on a mobile device, the virtual coupon associated with a purchasable item (as suggested by step 710); engaging, via the mobile device, in an electronic transaction related to the purchasable item and the virtual coupon (as suggested by step 720); allowing a user to select a target account from a plurality of available user accounts accessible electronically (as suggested by step 730); authenticating the transaction as a function of transaction attributes derived by the mobile device and the user selected target account (as suggested by step 740); and crediting the target account according to terms of the virtual coupon (as suggested by step 750). |
| 2 | The method of claim 1, wherein the plurality of accounts comprises multiple loyalty accounts, each associated with a distinct entity. |
| 3 | The method of claim 2, wherein the loyalty account comprise at least one of the following: a frequent flyer account, a credit card account, a bank account, a virtual world account, a game account, and a subscription account. |

TABLE 3-continued

Proposed Method of Mitigating Risk of Transaction Fraud Claims

| Number | Claim |
|---|---|
| 4 | The method of claim 1, wherein the target account is managed by a third party unaffiliated with the purchasable item. |
| 5 | The method of claim 1, wherein the transaction attributes comprise virtual coupon attributes associated with the virtual coupon. |
| 6 | The method of claim 5, wherein the virtual coupon comprises authentication criteria that depend to the virtual coupon attributes and the transaction attributes. |
| 7 | The method of claim 6, wherein the authentication criteria depend on at least one of the following: a location, a time, a context, a user identifier, a vendor identifier, an item identifier, and a real-world object attribute. |
| 8 | The method of claim 1, further comprising providing access to the mobile device to the user and wherein the mobile device conducts the steps of allowing the user to select the target account, authenticating the transaction, and crediting the target account (as suggested by step 735). |
| 9 | The method of claim 1, further comprising updating a coupon inventory with an amount credited to the target account (as suggested by step 770). |
| 10 | The method of claim 1, further comprising completing the transaction by reconciling payment between the target account and at least one other account (as suggested by step 780). |
| 11 | The method of claim 10, wherein the step of reconciling the payment includes submitting less than full payment to the at least one other account according to terms of the virtual coupon. |
| 12 | The method of claim 10, wherein the step of reconciling the payment includes receiving full payment from a user account. |
| 13 | The method of claim 10, wherein the step of reconciling the payment includes crediting the selected target account, wherein the target account comprises a subscription account. |
| 14 | The method of claim 1, wherein the step of providing the virtual coupon includes displaying a coupon overlay on an image of the purchasable item on a display of the mobile device (as suggested by step 715). |
| 15 | The method of claim 1, further comprising using the mobile device to derive object attributes of an object with a field of view of a sensor associated with the mobile device (as suggested by step 790). |
| 16 | The method of claim 15, further comprising the mobile device deriving the transaction attributes from the object attributes. |
| 17 | The method of claim 15, further comprising the mobile device identifying the purchasable item as a function of the object attributes. |
| 18 | The method of claim 15, further comprising constructing the field of view based on aggregating sensor data obtained while changing an orientation or position of the mobile device (as suggested by step 795). |
| 19 | The method of claim 18, wherein the step of aggregating the sensor data occurs in real-time as the mobile device is moved. |
| 20 | The method of claim 1, wherein the steps of engaging in the transaction requires no more than two user interface actions by the user. |
| 21 | The method of claim 20, wherein the steps of engaging in the transaction requires no more than one user interface actions by the user. |
| 22 | The method of claim 21, wherein the steps of engaging in the transaction occurs automatically via the user moving the mobile device. |
| 23 | A method of mitigating risk of transaction fraud, comprising: obtaining a virtual coupon on a mobile device, the virtual coupon associated with a purchasable item; engaging, via the mobile device, in an electronic transaction related to the purchasable item and the virtual coupon; and selecting a target account from a plurality of available user accounts accessible electronically; and providing an input that allows an authentication of the transaction as a function of transaction attributes derived by the mobile device and the user selected target account. |

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A computer-based method of reconciling a transaction using at least one processor and at least one memory, the method comprising:
determining, within a computer game, at least one object attribute based on physical data associated with a first player whose physical data has been derived from at least one sensor;
for a transaction, determining a first transaction amount of game points between a provider and a first user account of the first player and a second transaction amount of game points between the provider and a second user account of a second player, the transaction amounts being determined based on a reconciliation matrix and the at least one object attribute based on the physical data; and
causing reconciliation of the game transactions for the first transaction amount and the second transaction amount of game points among the provider, the first user account, and the second user account when at least one criterion based on the physical data of the first player is met within the computer game and based on involvement of the first user and the second user in the transaction.

2. The method of claim 1, wherein the physical data comprises one or more of the following: physical location, image data, image recognition features, color, shape, lighting, audio, size, or relative size.

3. The method of claim 1, wherein the first user account and the second user account are gaming accounts.

4. The method of claim 1, wherein the reconciling comprises a transfer of game points from the first user account and a transfer of game points from the second user account.

5. The method of claim 1, wherein the reconciling comprises a transfer of game points to the first user account and a transfer of game points to the second user account.

6. The method of claim 1, wherein the game points comprise virtual currency.

7. The method of claim 1, wherein the transaction comprises a payment for a service.

8. The method of claim 1, wherein the at least one object attribute includes at least one of the following: a time, a price, a physical location, a position, an orientation, a color, a size, a quantity, a quality, a shape, an availability, a make, a model, a cost, a message, metadata, a logo, an account number, a biometric, an image, and audio data.

9. The method of claim 1, wherein at least one of the first and the second user accounts comprises one of the following types of accounts: a credit card account, a bank account, a frequent flyer account, a virtual world account, a game account, and a subscription account.

10. The method of claim 1, wherein the reconciliation matrix comprises reconciliation rules.

11. The method of claim 10, wherein the reconciliation matrix comprises a mapping of the at least one object attribute, based on a recognition signature, to at least the first user account and the second user account.

12. The method of claim 11, wherein the recognition signature comprises attribute values related to the at least one object attribute.

13. The method of claim 1, further comprising:
authenticating the transaction as a function of transaction attributes.

14. The method of claim 13, wherein the transaction attributes include at least one of the following: a physical location, a time, a make, a model, a consumer ID, a device ID, a motion, biometric data, a fingerprint, a face, a signature, and a voice.

15. The method of claim 1, wherein at least one of the first player, the second player, and the provider includes at least one of the following: a user, a coupon provider, a vendor, a cell phone carrier, a gaming operator, a bank, or a third party exchange.

16. The method of claim 1, wherein the reconciliation matrix comprises reconciliation rules that operate as a function of a vector of attribute values.

17. The method of claim 16, wherein the vector of attribute values includes values for at least one of the following: an account holder identity, an image, a name, an age, an identification number, a bar code, a QR code, a location, an authorization, a motion, a finger print, a signature, or a voice.

18. The method of claim 1, wherein the physical data comprises at least one of: color, lighting, appearance, size, relative size, biometric data, image recognition features, audio, physical location, and geographic location.

19. A non-transitory computer-readable medium having computer instructions stored thereon, which, when executed by a processor, cause the processor to perform one or more operations comprising:
determining, within a computer game, at least one object attribute based on physical data associated with a first player whose physical data has been derived from at least one sensor;
for a transaction, determining a first transaction amount of game points between a provider and a first user account of the first player and a second transaction amount of game points between the provider and a second user account of a second player, the transaction amounts being determined based on a reconciliation matrix and the at least one object attribute based on the physical data; and
causing reconciliation of the game transactions for the first transaction amount and the second transaction amount of game points among the provider, the first user account, and the second user account when at least one criterion based on the physical data of the first player is met within the computer game and based on involvement of the first user and the second user in the transaction.

20. A reconciliation system, comprising:
at least one processor communicatively coupled with at least one memory storing instructions that, when executed by the at least one processor, cause the at least one processor to:
determine, within a computer game, at least one object attribute based on physical data associated with a first player whose physical data has been derived from at least one sensor;
for a transaction, determine a first transaction amount of game points between a provider and a first user account of the first player and a second transaction amount of game points between the provider and a second user account of a second player, the transaction amounts being determined based on a reconciliation matrix and the at least one object attribute based on the physical data; and
cause reconciliation of the game transactions for the first transaction amount and the second transaction amount of game points among the provider, the first user account, and the second user account when at least one criterion based on the physical data of the first player is met within the computer game and based on involvement of the first user and the second user in the transaction.

* * * * *